United States Patent [19]

Yamagami et al.

[11] Patent Number: 5,561,825
[45] Date of Patent: Oct. 1, 1996

[54] STORAGE SYSTEM AND METHOD OF REMOTELY CONTROLLING THE SAME

[75] Inventors: Kenji Yamagami, Sagamihara; Haruaki Watanabe, Yokohama; Shizuo Yokohata, Kanagawa-ken; Katsunori Nakamura; Yoshiro Shiroyanagi, both of Odawara; Akira Yamamoto, Sagamihara, all of Japan

[73] Assignee: Hitachi, Ltd., Tokyo, Japan

[21] Appl. No.: 262,904

[22] Filed: Jun. 21, 1994

[30] Foreign Application Priority Data

Jun. 23, 1993 [JP] Japan .................................. 5-151786

[51] Int. Cl.⁶ .................................................. G06F 1/04
[52] U.S. Cl. ........................... 395/878; 395/550; 395/494
[58] Field of Search ................................... 395/494, 550, 395/878, 438, 439

[56] References Cited

U.S. PATENT DOCUMENTS 4,218,759 8/1980 Carlton et al. .......................... 395/878

OTHER PUBLICATIONS

"Nikkei Computer", published by Nikkei BP Co. Ltd., Sep. 24, 1990, pp. 57–58.
Hitachi Manual: HITAC H–6581–C3 Type Disc Driver, H–6587 Type Disc Driver, H–6586 Type Disc Driver, H–6585 Type Disc Driver, H–6598 Type Disc Driver, 8080–2–130–10, p. 138.

*Primary Examiner*—David L. Robertson
*Attorney, Agent, or Firm*—Fay, Sharpe, Beall, Fagan, Minnich & McKee

[57] ABSTRACT

A storage system connected to host processors through data transfer paths includes at least one storage unit for moving a head for reading/writing the data relatively to a storage medium to read/write the data from/to the storage medium, and a controller for controlling the data transfer between the host processors and the storage units. The controller obtains and stores, every data transfer path, the information relating to the delay time which occurs when transferring the data through the data transfer path of interest. When an I/O request is issued from the host processor, in accordance with the measured information of the delay time in the data transfer paths, a request for positioning the head near the position on the storage medium in which the data is stored which is to be read/written is issued. In addition, when posting the release of the wait state to the host processors which had issued the I/O requests and are made wait the completion of the processings for other I/O requests, the order of issuing the notification is determined in accordance with the delay time in the data transfer paths which are permitted to be used in order to process the I/O requests.

37 Claims, 18 Drawing Sheets

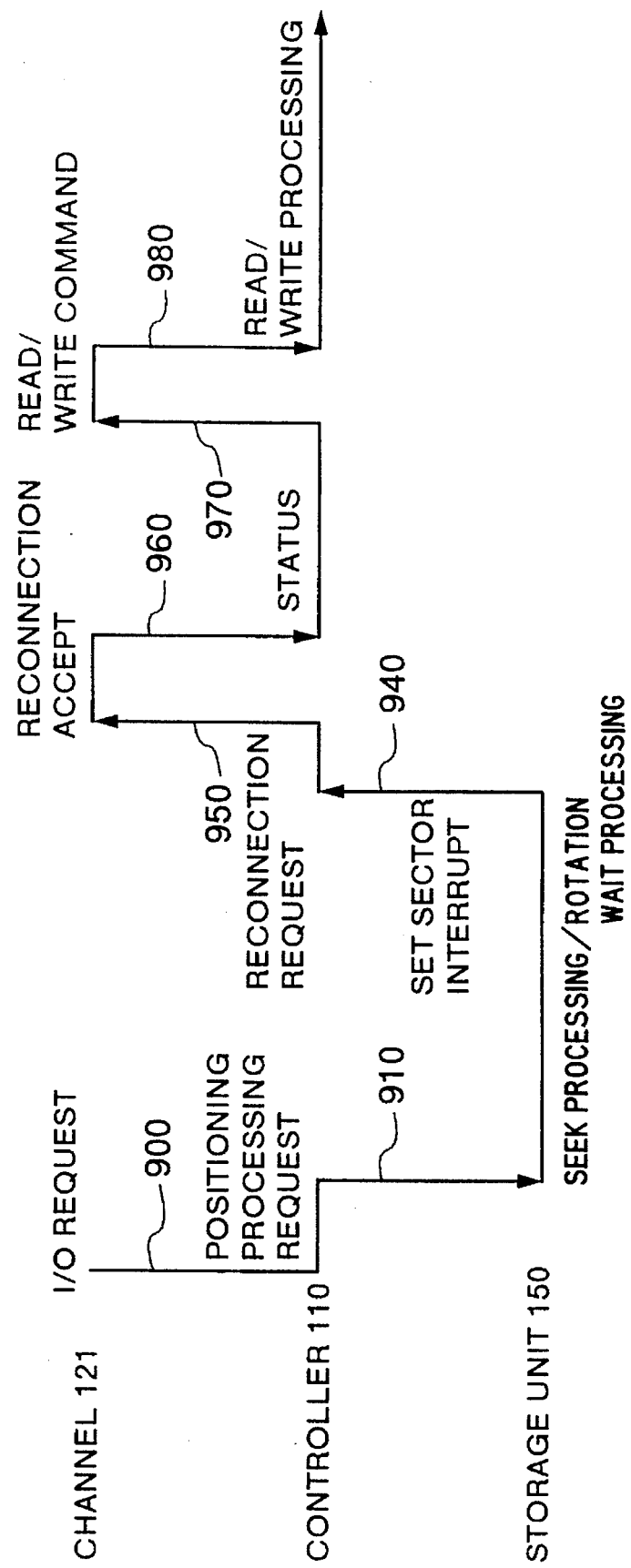

| 1410 | 1420 | 1430 |
|---|---|---|
| MAXIMUM VALUE | MINIMUM VALUE | MEAN VALUE | ~1400
| MAXIMUM VALUE | MINIMUM VALUE | MEAN VALUE | ~1400
| ⋮ | ⋮ | ⋮ |
| MAXIMUM VALUE | MINIMUM VALUE | MEAN VALUE | ~1400

| | 2110 | 2120 | 2130 | |
|---|---|---|---|---|
| | MAXIMUM VALUE | MINIMUM VALUE | MEAN VALUE | 2100 |
| | MAXIMUM VALUE | MINIMUM VALUE | MEAN VALUE | 2100 |
| | ⋮ | ⋮ | ⋮ | |
| | MAXIMUM VALUE | MINIMUM VALUE | MEAN VALUE | 2100 |

STORAGE SYSTEM AND METHOD OF REMOTELY CONTROLLING THE SAME

BACKGROUND OF THE INVENTION

The present invention relates, in general, to a storage system which is utilized in a computer system and the like, and more particularly to a storage system which is connected to host processors through cables each having a large connectable distance.

As for the technology relating to the architecture of transfer paths through which host processors and storage units provided in a computer system and the like are connected to one another, for example, there is well known the technology as described in an article "NIKKEI COMPUTER", published by NIKKEI BP Co. Ltd., Sep. 24, 1990, pp. 57 to 58. This article discloses the technology relating to a storage system in which host processors and storage units are connected to one another through optical fiber cables. According to this article, it is shown that the host processors and the storage units are connected to one another through the optical fiber cables in such a way, whereby the connection distance between the associated host processor and storage unit can be extended up to 9 km at a maximum. That is, the optical fiber cable is employed for the connection between the host processor and the storage unit, whereby the connectable distance thereof can be increased remarkably up to the order of km.

On the other hand, in HITACHI MANUAL: HITAC H-6581-C3 TYPE DISC CONTROLLER, H-6587 TYPE DISC DRIVER, H-6586 TYPE DISC DRIVER, H-6598 TYPE DISC DRIVER, H-8598 TYPE DISC DRIVER, 8080-2-130-10, pp. 138, there is described the data transfer method for use in a disc unit which is a typical one of the storage units employed in the computer system.

Normally, with the disc unit, prior to the data transfer, the positioning processing, such as the seek processing and the rotation wait processing, of positioning a head for reading/writing the data in a data recording position on a disc as the recording medium needs to be executed. While executing the positioning processing, both the data transfer paths distributed between the controller and the host processors, and the data transfer paths distributed between the controller and the disc units are released. Thereafter, when the head of the disc unit approaches to the recording position in which the data is intended to be read/written, those data transfer paths which have been released are occupied again (hereinafter, this processing is referred to as "the reconnection", when applicable), and then the processing of reading/writing the data begins to be executed.

In the above-mentioned prior art, by employing the optical fiber cables, the connection distances between the host processors and the storage units are increased. However, by increasing the connection distances between the host processors and the storage units, the time required for the data to be transmitted through the cable, i.e., the delay time, which has not become the great problem conventionally can not be disregarded as compared with the time required for the data to be transmitted to/from the storage unit. However, in the above-mentioned prior art, such delay time was not taken into consideration at all. For example, under the conditions in which the data transfer between the host processors and the associated disc units was performed on the basis of the electric signals, and the lengths of the cables, through which the host processors and the disc units were connected to each other, are uniformly short, the timing of starting the execution of the reconnection which was carried out after the completion of the positioning processing for the disc unit corresponded to the time point when the head of the disc unit was always positioned before the recording position of the data to be read/written by a fixed distance. However, if the length of the cable through which the host processor and the disc unit are connected to each other is increased, there is encountered the situation in which the time required for the host processors to inform of start of the execution of the reconnection is necessarily increased, and on completion of the reconnection, the head of the disc unit passes the position where the data, which is an object of read/write, is to be recorded. As a result, there arises the problem that it is necessary to wait the head to be positioned in the position, where the data is to be recorded, again, and thus the performance is degraded remarkably.

In addition, there is an example of the inconvenience which occurs when the input/output requests (the I/O requests) are issued competitively from a plurality of host processors to the same storage unit. For example, let us consider that in the state in which while the storage unit executes the processings for the I/O request issued from a certain host processor, the storage unit receives other I/O requests issued from other two or more host processors and those requests are waited to be processed, the processings for the I/O request in execution has been completed. In such a case, normally, the storage unit of interest posts the fact that the next I/O request becomes executable to the host processors, and then processes the I/O request which has been received first from the host processor. In this case, under the conditions in which the cables through which the host processors and the storage units are connected to one another are uniformly short in length, if the I/O request which has been received first from the host processor is next executed, there arises in particular no problem. However, if the range of the length of each cable is increased, and thus the cables distributed between the host processors and the storage units become different in length from one another, the difference occurs in the time required for the notification, sent from the storage unit, for posting that the next I/O request is executable to reach the host processors. Therefore, there is the possibility that in the above-mentioned method, the I/O request issued from the host processor, which has the larger connection distance to the associated storage unit, is always waited to be processed, and if the worst comes to the worst, that host processor falls into the situation in which it can not receive the service.

SUMMARY OF THE INVENTION

It is therefore an object of the present invention to provide a storage system in which the inconvenience as described above is solved which is caused, in terms of control of the storage units, by the increasing of the delay time resulting from the extension of the connectable distances between the host processors and the storage units.

In order to attain the above-mentioned problems, in a storage system according to the present invention, a controller for controlling the data transfer between storage units and host processors includes: a delay time measuring facility for measuring, every data transfer path, a length of the data transfer path or delay time required for the data to be transmitted through the data transfer path of interest to store the resultant information in an internal memory provided in the controller; and a delay time controlling facility for referring to the measured information thus stored relating to the delay time in the data transfer paths to change, in accordance with the measured information, the control for I/O requests issued from the host processors.

In the storage system of the present invention, according to a more preferable aspect, the delay time controlling facility includes a reconnection timing modification facility for modifying, in accordance with the measured information, the execution start timing of the reconnection. In addition, in order to guarantee the service for the I/O request which has been received through the longer data transfer path when releasing a plurality of I/O requests for the storage units, the delay time controlling facility includes a high priority wait state release facility for referring the measured information such as the lengths of the data transfer paths to release a wait state of the I/O request, which has been received through the longer data transfer path, top priority.

In the present invention, by the operation of the above-mentioned delay time measuring facility, the length, or the delay time required for the data to be transmitted through the associated data transfer path is measured every cable, i.e., data transfer path distributed between the associated host processor and storage unit, and the measured information thus obtained is stored in the internal memory in the controller. In addition, by the operation of the delay time controlling facility, the measured information thus stored with respect to the data transfer paths are referred, and in accordance with the measured information, the control for the I/O requests which have been issued from the host processors is determined. As a result, it is possible to solve the inconvenience which is caused, in terms of control of the storage units, by the increasing of the overhead time required for the data to be transmitted through the associated cable.

More specifically, for example, by the operation of the reconnection timing modification facility, in accordance with the measured information in the delay time measuring facility, the execution start timing of the reconnection is modified. As a result, the problem can be effectively prevented such that at the time when the reconnection has been completed, the head of the disc unit passes the position from/to which the data is intended to be read/written, and thus the performance is remarkably degraded. In addition, by the operation of the high priority wait state release facility, in accordance with the measured information in the delay time measuring facility, the wait state of the I/O request which has been received through the longer data transfer path is released top priority. As a result, it is also possible to guarantee the service for the I/O request which has been received through the longer data transfer path.

BRIEF DESCRIPTION OF THE DRAWINGS

FIG. 7 is a timing chart showing a typical example in which a record is accessed;

FIG. 11 is a view showing a structure of a delay time statistical table per pass group;

FIG. 16 is a view showing a structure of a delay time statistical table per host processor;

DESCRIPTION OF THE PREFERRED EMBODIMENTS

Figure 1:
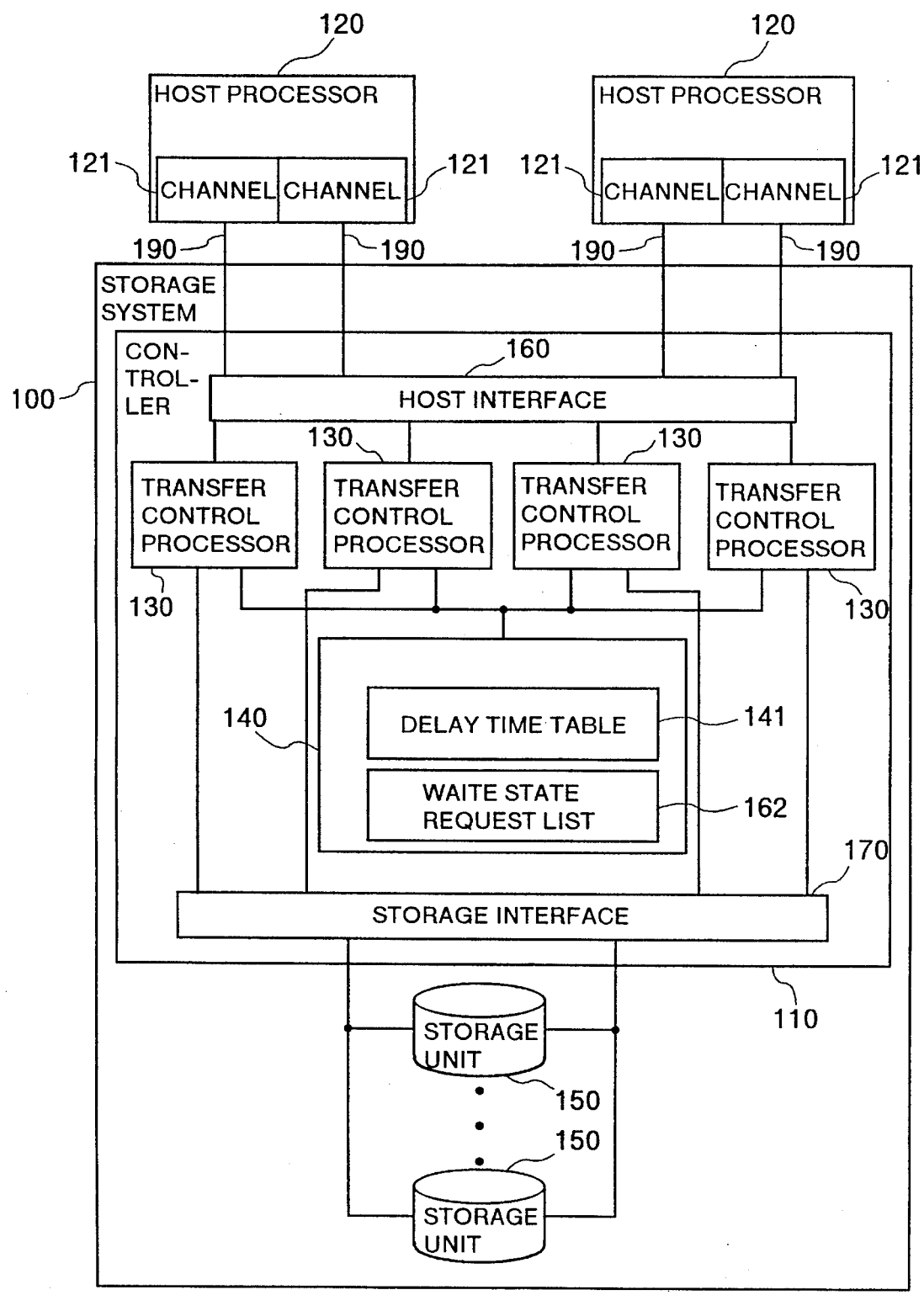
FIG. 1 is a block diagram showing a configuration of a computer system according to a first embodiment of the present invention.

FIG. 1 is a block diagram showing a schematic configuration of a first embodiment of a computer system to which the present invention is applied. In FIG. 1, the reference numeral 100 designates a storage system which includes, but is not limited to, a controller 110 and a plurality of storage units 150. The controller 110 includes, but is not limited to, one or more transfer control processors (four transfer processors in the present embodiment) 130, a shared memory 140 which is used commonly by the transfer control processors 130, a host interface 160 and a storage interface 170. The reference numeral 120 designates each host processor to which the storage system 100 is connected and which has one or more channels (two channels in the present embodiment) 121, as an interface, between the controller 110 and the host processors 120. Each channel 121 is connected to the host interface 160 of the controller 110 through a cable such as an optical fiber cable. Incidentally, the configuration may also be available such that each host processor 120 has no channel 121, a processing unit (not shown) provided in each host processor 120 is directly connected to the storage system through the suitable cable. Likewise, in the controller 110 as well, the configuration may also be adopted such that no host interface 160 is provided, and the transfer control processors 130 are directly connected to the associated host processors 120 through the cables 190. In addition, the cables 190 through which the host processors 120 and the controller 110 are connected to one another may be different in length from one another. Further, the cables 190 connected between the same host processor 120 and the controller 110 may be different in length from one another. Now, in the case where the processing of the data transfer between a certain host processor 120 and the associated storage unit or units 150, all the cables 190 which are distributed between the host processor 120 of interest and the controller 110 may be permitted to be used, or alternatively only a part of the cables 190 may also be permitted to be used. In addition, the different usable cables 190 may be alotted to the storage units 150.

The transfer control processors 130 operates to control the data transfer between the storage units 150 and the host processors 120, and each transfer control processor 130 includes, as the characteristic facilities, both a delay time measuring facility and a delay time adaptive control facility. In the present embodiment, both the delay time measuring facility and the delay time adaptive control facility are realized by the program control in each transfer control processor 130. However, alternatively, the method may also be adopted such that the same facilities as those of each transfer control processor 130 are realized by the dedicated hardware and the like, and such facilities are incorporated in the controller 110.

The shared memory 140 stores the shared information to which each transfer control processor 130 is to refer. In the shared memory 140, the information such as a delay time table 141 and a wait state request list 162 is stored.

Each transfer control processor 130 of the controller 110 is connected to the storage units 150 via the storage interface 170. Of course, in the same manner as in the connection between the host processors 120 and the transfer control processors 130, it is also possible to connect directly the transfer control processors 130 and the storage units 150 to one another without via the storage interface 170.

Figure 2:
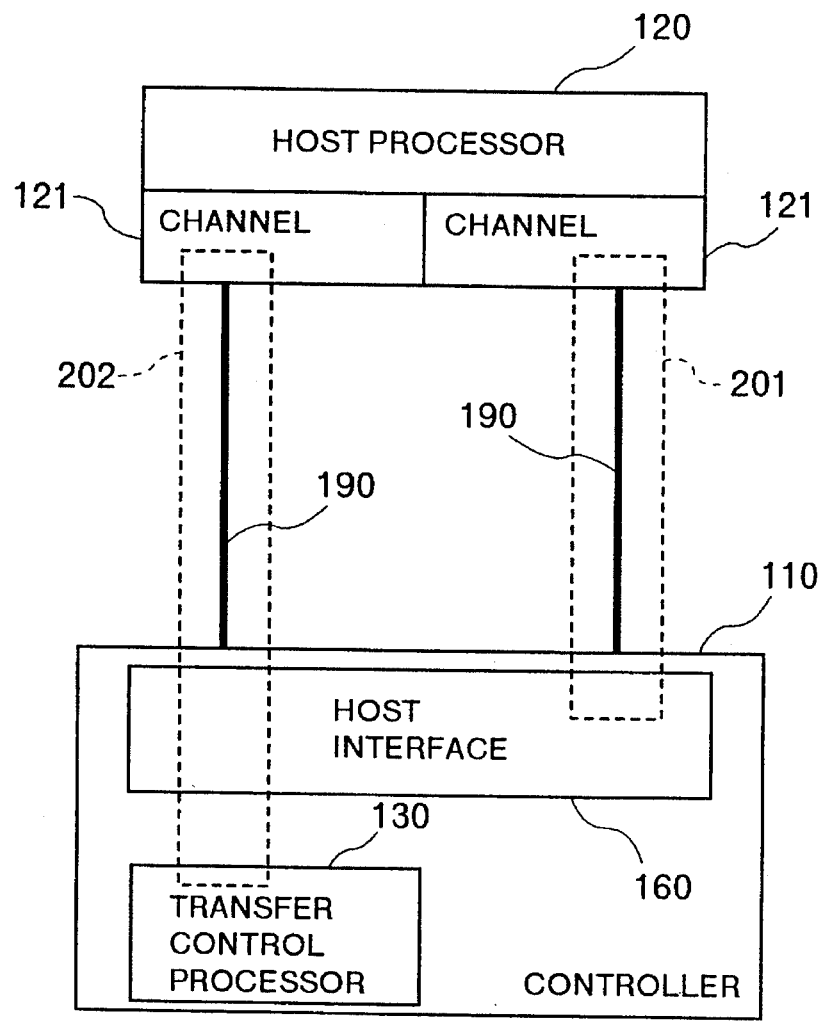
FIG. 2 is a conceptual view useful in explaining the definition of a data transfer path.

FIG. 2 shows two examples as a way of thinking with respect to the data transfer path which becomes a unit when measuring the time delay in the data transfer. One is such that as in the data transfer path 201, the portion corresponding to the cable 190 distributed between the host processor 120 and the host interface 160 is considered to be the data transfer path. The other is such that as in the data transfer path 202, the portion corresponding to the path extending from the host processor 120 up to the transfer control processor 130 in the controller 110 is considered to be the data transfer path. As for the unit which is used to measure the time delay in the data transfer, either the former or the latter may be employed.

Figure 3:
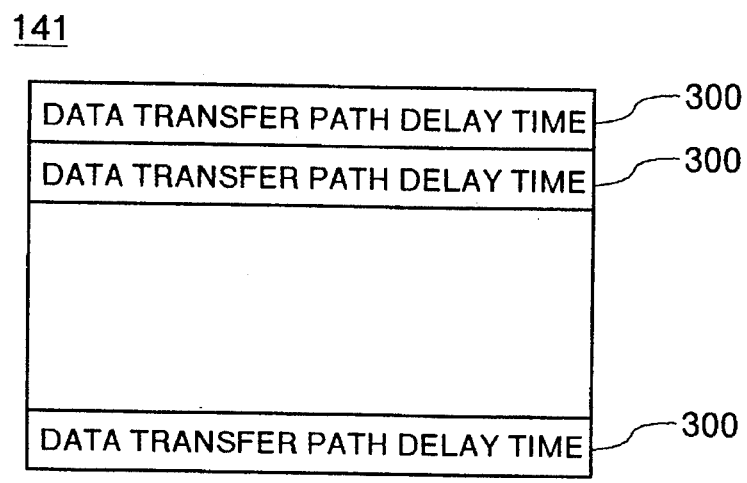
FIG. 3 is a view showing a structure of a delay time table 141.

FIG. 3 shows a structure of the delay time table 141 provided in the shared memory 140. The delay time table 141 has a plurality of entries 300 corresponding to the data transfer paths, and in the entries 300, the data transfer path delay time in the data transfer paths corresponding thereto is stored. More specifically, the delay time is set which occurs when the data is transmitted through the associated data transfer path. In the present embodiment, the delay time itself which occurs when transmitting the data through the data transfer path is employed as the data transfer delay time. However, alternatively, any measure such as the physical length of the data transfer path may be employed as long as the delay time can be calculated or estimated. The number of entries 300 of the delay time table 140 is equal to the number of cables 190 connected in the case where the data transfer path a201 shown in FIG. 2 is used as the measurement unit. On the other hand, in the case where the data transfer path b202 is used as the measurement unit, even when the data is transferred through the same cable 190, if the different transfer control processors 130 are used, the different data transfer paths will be necessarily provided. Therefore, the number of entries 300 becomes the value, which is obtained by multiplying the number of cables 190 connected by the number of transfer control processors 130, at a maximum.

Figure 4:
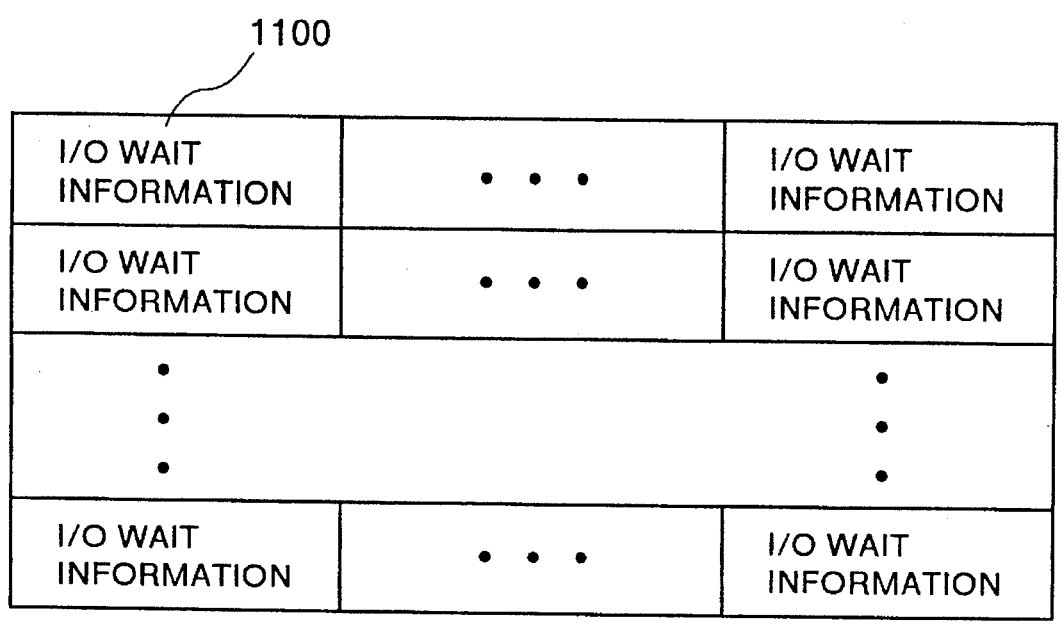
FIG. 4 is a view showing a structure of a wait state request table 162.

FIG. 4 is a view showing a structure of the wait state request table 602.

The wait state request table 602 has the two-dimensional structure logically. In each entry 1100, the I/O wait information is stored. The rows of the wait state request table 602 correspond to the different storage units 150. In addition, the columns of the wait state request table 602 correspond to the different host processors 120. That is, the I/O wait information 1100 is registered in the wait state request table 602 in correspondence to both the storage unit 150 which is used as an object of read/write by the received I/O request and the host processor 120 which has issued that I/O request. Therefore, the number of I/O wait information is equal to the product of the number of storage units 150 connected to the controller 110 and the number of host processors 120 connected thereto. The controller 110 operates, when receiving the I/O request issued from the host processor 120, if the storage unit 150 which is intended to be accessed is occupied by another I/O request, to make that I/O request in the wait state. At this time, in the entry 1100 corresponding to both the host processor 120 which has issued that I/O request and the storage unit 150 which is to be accessed by that I/O request, the information relating to that the I/O request of interest enters into the wait state is registrated. For the processing for managing the I/O requests issued from the host processors 120 to the associated storage units 150 by the controller 110, the well known technology can be used, and therefore, the detailed description thereof is omitted here for the sake of simplicity.

Next, the description will hereinbelow be given with respect to the processings which are executed by the delay time measuring facility realized by each transfer control processor 130.

The host processor 120 issues, when intending to issue any instruction to the controller 110, a command for defining the contents of that instruction to the controller 110. In general, in order to issue one command from the host processor 120 to the controller 110, carrying out a plurality of exchanges of the control information therebetween is determined in the form of a protocol. When a predetermined command has been issued from the host processor 120, the associated transfer control processor 130 measures the time required for the transmission of the control information which is exchanged in accordance with the protocol which is determined with respect to that command, i.e., a time period ranging from the time point when sending the control information, by which the response from the host processor 120 can be obtained, to the host processor 120 up to the time point when receiving the control information, as the response, from the host processor 120, and then makes the measured time period the delay time. In the present embodiment, the specific command which is issued from the host processor 120 when activating the system is determined as the command which is used in measuring the delay time. As for the command used in measuring the delay time, for example, one of the commands for prescribing the I/O request may be employed which is issued when the host processor 120 intends to input/output the data to/from the associated storage unit 150. Of course, the method may be available such that the command for measuring the delay time is not specified, and the measurement is performed with respect to an arbitrary plurality of commands or all the commands to obtain the delay time. Incidentally, in the case where the command for prescribing the I/O request is used in measuring the delay time, the measurement of the delay time is performed whenever the I/O occurs, and as a result, the overhead of the I/O processing is increased that much more remarkable. In addition, as for the method of measuring the delay time, in addition to the method of measuring, as described above, the time period ranging from the time point when sending one control information up to the time point when receiving the control information as the response thereof, there may be employed the method of measuring the time required for the control information to be sent/received sometimes, the method of measuring only one of the sending time and the receiving time of the control information, or measuring both the time separately, and so forth.

Figure 5:
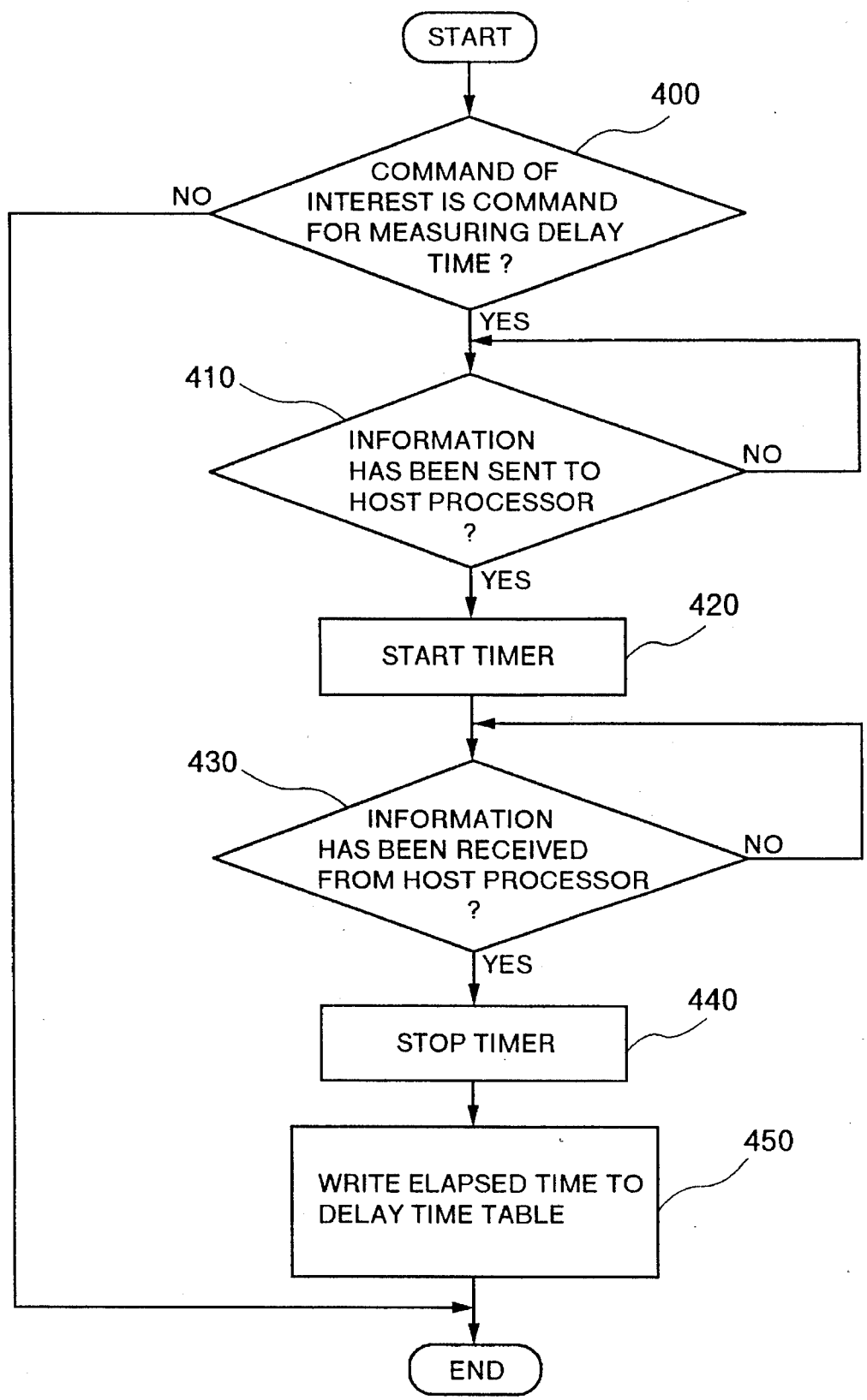
FIG. 5 is a flow chart showing a flow of the processings which are executed by a delay time measuring facility.

FIG. 5 is a flow chart showing a flow of the processings which are executed by the delay time measuring facility.

The transfer control processor 130 activates, when receiving the command issued from the host processor 120, the delay time measuring facility. In the processings executed by the delay time measuring facility, first, it is checked whether or not the command issued from the host processor 120 is the specific command which is previously determined as the command for measuring the delay time (Step 400). In the case where it is judged that the received command is not the specific command, the transfer control processor 130 completes the processings which are to be executed by the delay time measuring facility and then executes the processings which should be executed originally in accordance with the received command. In Step 400, in the case where it is judged that the received command is the specific command, the transfer control processor 130 continues, in parallel with the processings which should be executed originally in accordance with that command, the processings which are to be executed by the delay time measuring facility. In Step 410, the delay time measuring facility waits until the control information is transmitted to the host processor 110 in accordance with the protocol which is determined with respect to the received command. When the control information has been transmitted towards the host processor 110, the timer is started in order to measure the delay time (Step 420). Thereafter, the delay time measuring facility waits until the control information, as the response to the control information which has been transmitted, is received from the host processor 120 (Step 430). When the control information, as the response, has been received from the host processor 120, the timer is stopped (Step 440). Finally, the value is read out from the timer and then the elapsed time required for the control information to be sent/received is obtained from that value. Then, the data relating to the elapsed time thus obtained is stored, as the data transfer path delay time, in the entry 300, in the delay time table 141, corresponding to the data transfer path which is in the processing.

Subsequently, the description will hereinbelow be given with respect to the delay time adaptive control facility as another characteristic facility which each transfer control processor has in the present embodiment.

In the processings which are to be executed by the delay time adaptive control facility, in accordance with the data transfer path delay time, the control for processing the I/O request is determined. In the present embodiment, the delay time adaptive control facility can be considered to be further divided roughly into two large facilities. A first facility is a facility which is used to determine the timing of the reconnection in the reconnection processing which is executed when processing the I/O request and the like issued from the host processor 120. A second facility is a facility which is used to determine the timing when the release of the wait state is posted to the host processors 120 which had issued the I/O requests in the wait state. In the present specification, hereinafter, the first facility is referred to as "the reconnection starting time adjusting mechanism", and the second facility is referred to as "the high priority wait state release mechanism". Hereinbelow, the description will be given with respect to the processings which are realized by the reconnection starting time adjusting mechanism and those which are realized by the high priority wait state release mechanism in this order.

First, prior to the description of the reconnection starting time adjusting mechanism, the reconnection will hereinbelow be described in brief.

Figure 6A:
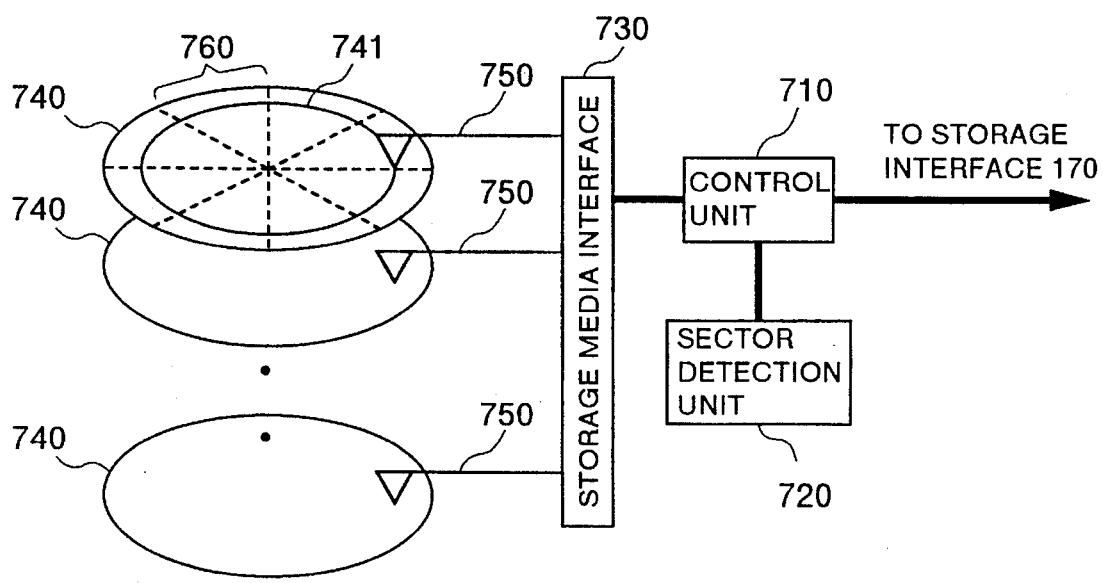
FIG. 6A is a block diagram, partly in schematic view, showing a simplified configuration of a storage unit.

FIG. 6A is a block diagram showing a schematic configuration of the disc unit which is used as the storage unit 150 in the present embodiment. The storage unit 150 includes, but is not limited to, one or more circular storage media 740, heads 750, a storage media interface 730, a storage media control unit 710, and a sector detection unit 720. The storage media control unit 710 operates to control the data transfer between the storage media 740 and the controller 110. The heads 750 have the function of reading/writing the data from/to the rotating storage media 740 and are provided in one-to-one correspondence to the storage media 740. In each circular storage medium 740, the unit called a sector 760 is set every fixed angle. In order to recognize uniquely the sectors 760, the numbers (the sector numbers) are assigned to the sectors 760, respectively. The sector detection unit 720 has the function of recognizing the sector 760 from/to which the data is read/written by the head 750 at present. In addition, the sector detection unit 720 has the function of giving, when the head 750 reaches the sector 760 specified by the controller 110, an interrupt to the controller 110 via the storage media control unit 710.

Figure 6B:
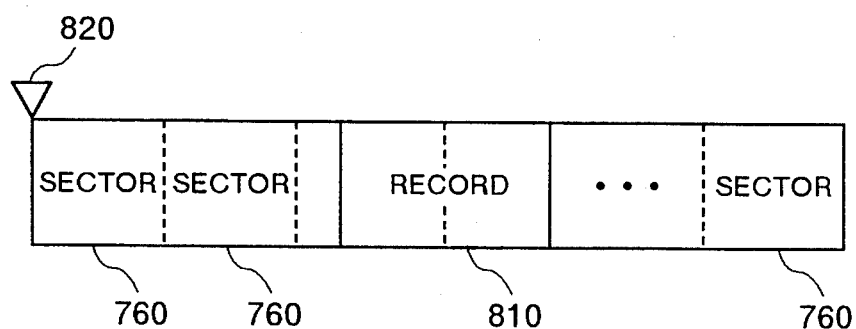
FIG. 6B is a view showing a logical structure of a track on a storage medium.

The circular recording unit, to which while the storage medium 740 makes one rotation, the head 750 is accessible, is called a track 741. A plurality of tracks 741 are present concentrically on each storage medium 740. When the I/O of the data is intended to be performed with a certain track 741 as an object, the head 750 is moved to the position on the objective track 741 where the data can be read/written. This processing is called the seek processing. FIG. 6B shows an example of a typical structure of one track 741. In a certain position of the track 741, the lead of the track 741 which is called an index 820 is determined. In this connection, one track 741 is divided into a plurality of sectors 760 as has already been described.

In addition, a plurality of records 810 each of which is a unit of read/write of the data are present in the track 741. One record 810 may be, depending on its size, sometimes stored within one sector 760 on the track 741, otherwise stored over a plurality of sectors 760. In FIG. 6B, each boundary between the adjacent sectors 760 are shown by a dotted line, and thus it is shown that one record 810 is stored over the third and fourth sectors. Normally, in order to enable each record 810 to be recognized, the record numbers are assigned to the records 810, respectively. In order to read/write the data from/to the associated record 810, the rotation of the storage medium 740 must wait until after completion of the seek processing, the head 750 becomes able to read/write the data from/to the record 810. This processing is called the rotation wait processing.

The above-mentioned seek processing and rotation wait processing are altogether called the positioning processing. While the storage unit 150 executes the positioning processing, it is not required that the resources, such as the transfer control processors 130 and the cables 190, for use in the data transfer between the storage units 150 and the host processors 120 are kept being secured. Therefore, in general, while the storage unit 150 executes the positioning processing, those resources are released, and after completion of the positioning processing by the storage unit 150, those resources are resecured to start the data transfer processing. This processing for resecuring the resources is called the reconnection.

FIG. 7 is a timing chart showing an example of the timing in the case where, in order to read/write the data from/to a certain record 810, the host processor 120 accesses to the associated storage unit 150. The host processor 120 issues, in order to access to the record within the storage unit 150, the I/O request 900 to the controller 110 through the associated channel 121. The I/O request 900 issued from the host processor 120 includes, but is not limited to, as the information used to determine the record 810 on the storage unit 150 from/to which the data is to be read/written, the track number of the track 741 to which that record 810 belongs, the sector number of the sector 760 within that track 741, and the record number of that record 810. In general, as for the sector number which is to be sent to the controller 110, the sector number of the sector just before the sector in which the record 810, which is an object of read/write of the data, is stored is employed.

The transfer control processor 130 in the controller 110 secures, when receiving the I/O request 900 which has been issued from the host processor 120, the storage unit 150 in which the record, which is an object of the I/O, is stored, and then issues a positioning processing execution request 910 to that storage unit 150 on the basis of the track number, the sector number, the record number and the like which have been shown by the I/O request 900. The positioning processing execution request 910 includes the sector number for indicating the sector at which the reconnection is started after completion of the positioning processing to the storage unit 150. In the present embodiment, the transfer control processor 130 does not treat the sector number itself, which has been received from the host processor 120, as the sector number of the sector at which the reconnection is to be started, but indicates the sector number which is determined on the basis of the sector number, which has been received from the host processor 120, by the reconnection starting time adjusting mechanism to the storage unit 150. The concrete contents of this processing will be described later.

When receiving the positioning request 910 issued from the controller 110, the storage unit 150 first executes the seek processing to move the head 750 to the track which becomes an object of the access. Next, the storage unit 150 waits that the head 750 reaches the sector 760 having the specified sector number on the basis of the operation of the sector detection unit 720. When the head 750 has reached the objective sector 760, the storage unit 150 posts the completion of the positioning processing to the controller 110 by generating the interrupt. Hereinafter, this interrupt is referred to as "a set sector interrupt 940", when applicable. When the set sector interrupt 940 has been generated, this set sector interrupt 940 is then received by the transfer control processor 130 which is not in the operation (which does not execute any other processing). The transfer control processor 130 which has received the set sector interrupt issues a reconnection request 950 to the associated host processor 120, thereby posting that the data transfer becomes practicable. If the reconnection is practicable, the host processor 120 receives the reconnection request 950 and then issues a reconnection accept notification 960 to the associated transfer control processor 130. When receiving the reconnection accept notification 960, the transfer control processor 130 posts, in order to prevent the competition of occupation of the storage unit 150 of interest among the transfer control processors 130, that it will occupy the storage unit 150 of interest to other transfer control processors 130. The processings as described above are the concrete contents of the reconnection processing. Thereafter, the controller 110 starts the processing of reading/writing the data from/to the objective record 810 on the storage unit 150 and controls the data transfer between the host processor 120 and the associated storage unit 150.

As described above, for a time period ranging from the time point when the storage unit 150 posts the set sector interrupt 940 up to the time point when after completion of the reconnection, the data can be read/written from/to the objective track, a lot of processings are executed. The time required for those processings to be executed can not be disregarded as compared with the rotation time of the storage media 740. Thus, the set sector interrupt 940 needs to be posted before the head 750 reaches the record 810 from/to which the data is intended to be read/written. Therefore, the transfer control processor 130 issues the positioning processing request employing the sector number of the sector (the sector which the head 750 passes prior to the objective sector) before the sector including the objective record as the sector number of the sector at which the storage unit 150 generates the set sector interrupt. As previously stated, the sector number which is used at that time is determined by the reconnection starting time adjusting mechanism. In the present embodiment, it is permitted that the lengths of the data transfer paths between the controller 110 and the host processors 120 are largely different from one another. As a result, the time required for the reconnection request and the reconnection accept to be posted is greatly varied depending on the lengths of the data transfer paths, and also the time required for the reconnection processing to be executed becomes diverse. Thus, the sectors which are suitable as the sectors, at which the set sector interrupts are to be generated are different depending on the data transfer paths. In the processings executed by the reconnection starting time adjusting mechanism, thus, by taking the data transfer delay time which is different depending on the data transfer paths into consideration, each sector which is suitable as the sector at which the set sector interrupt 940 to be generated is determined to obtain its sector number.

Figure 8:
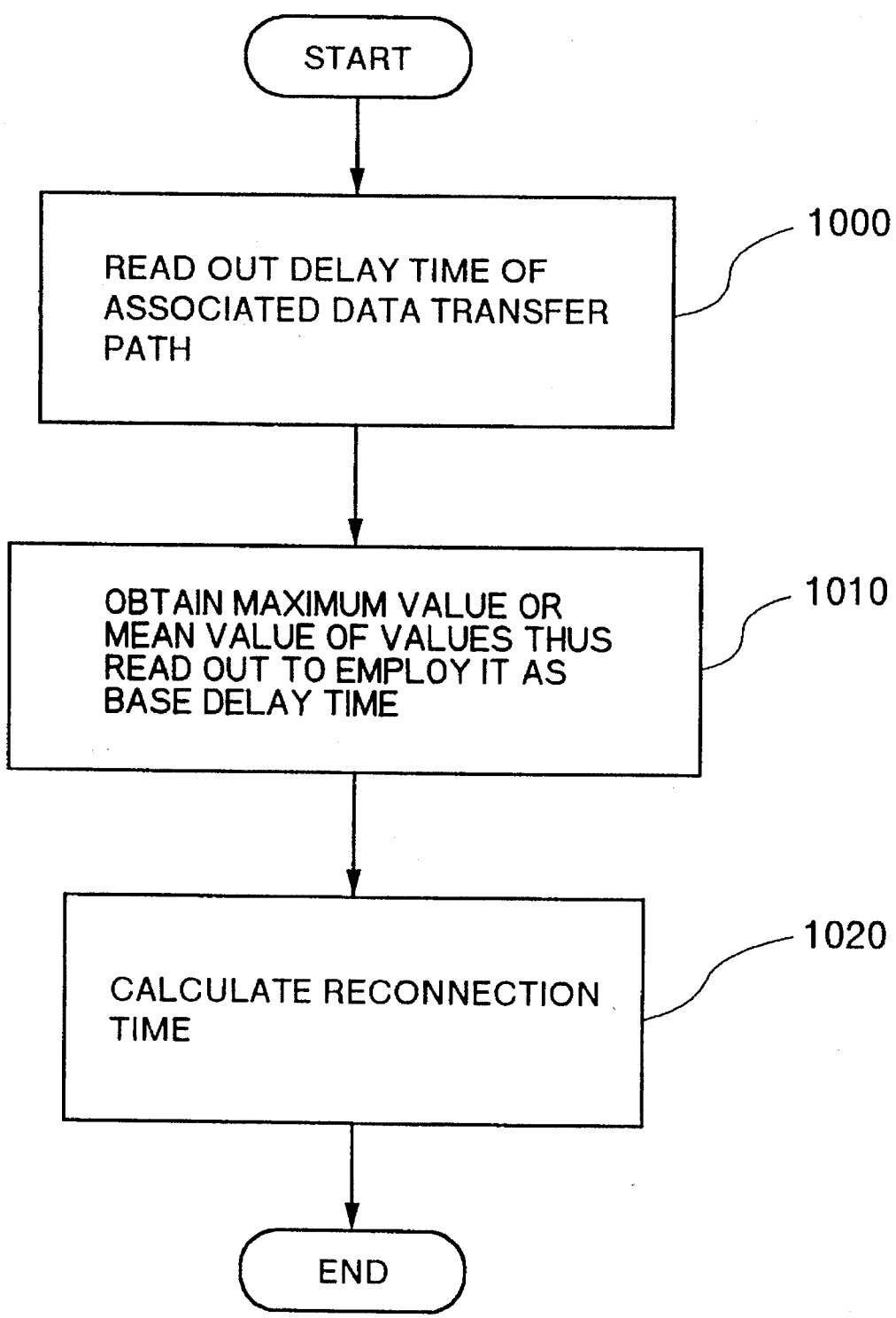
FIG. 8 is a flow chart showing a flow of the processings which are executed by a reconnection starting time adjusting mechanism.

FIG. 8 is a flow chart showing the processings which are executed by the reconnection starting time adjusting mechanism. The reconnection starting time adjusting mechanism is activated when the transfer control processor 130 has received the I/O request issued from the host processor 120.

After activated, the reconnection starting time adjusting mechanism first reads out the data transfer path delay time which is stored in the entry 300 corresponding to the data transfer path 200, which is permitted to be used due to the processing of the I/O request, from the delay time table 141 (Step 1000). Thereafter, a maximum value or a mean value of the data transfer path delay time thus read out is obtained as the base delay time (Step 1010). Whether the maximum value or the mean value of the data transfer path delay time, which has been read out as the base delay time, is employed depends on the request from the system. For example, in the case where the reconnection is made in time for any data transfer path 200, the maximum value is employed as the base delay time. On the other hand, in the case where for the data transfer path 200 having the average delay time, the reconnection has only to be in time, the mean value is employed. In this connection, in accordance with the system request, one of the maximum value and the mean value may be employed, or alternatively both the maximum value and the mean value may be employed with those mixed.

Next, the reconnection starting time adjusting mechanism calculates the sector number (the interrupt generation sector number), on the basis of which the set sector interrupt is to be received, by using the base delay time which has been obtained in Step 1010 and on the basis of the following expression (1) (Step 1020).

$$S_{INT} = S_{ORG} - (N_{TR} * T_{BD} + T_{OH})/T_{TS} \qquad \text{Expression (1)}$$

where $S_{INT}$ represents the interrupt generation sector number, $S_{ORG}$ represents the sector number which is received from the host processor 120, $N_{TR}$ represent the number of send/receive of the control information which is executed between the host processor 120 and the reconnection starting time adjusting mechanism in the reconnection, $T_{BD}$ represents the base delay time, $T_{OH}$ represents the overhead time of the reconnection, and $T_{TS}$ represents the time required for the head 750 to pass the sector. Incidentally, in the case where the value of Expression (1) takes a negative value, i.e., the head 741 passes the lead of the track 741 and the sector 760 which is located backward the track 741 needs to be selected, the value is employed which is obtained by adding the number of sectors 760 in the track 741 to the value obtained from Expression (1).

In Step 1020, when the transfer control processor 130 has obtained the sector number, the processings executed by the reconnection starting time adjusting mechanism are completed. Then, by using the sector number thus calculated, the positioning request is issued to the associated storage unit 150.

Figure 9:
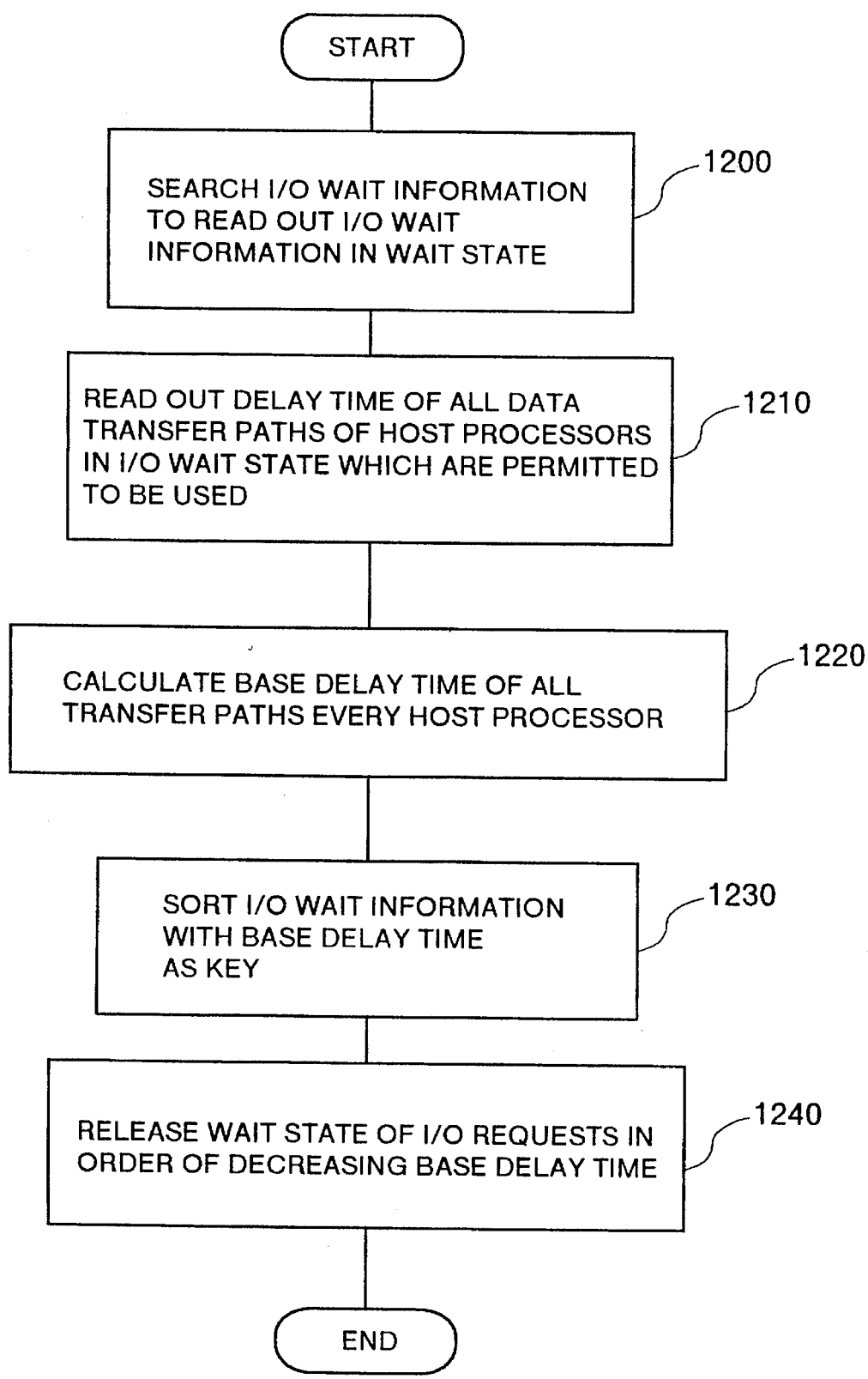
FIG. 9 is a flow chart showing a flow of the processings which are executed by a high priority wait state release mechanism.

Subsequently, the description will hereinbelow be given with respect to the processings which are to be executed by the high priority wait state release mechanism. In the processings executed by the high priority wait state release mechanism, in the case where a plurality of I/O requests to the storage units 150 are in the wait state, the data transfer path delay time 300 of the data transfer paths 202, 201 are referred and the service for the I/O request which has been received through the longer data transfer path is guaranteed to release the wait state of the I/O requests. FIG. 9 shows a flow chart of a flow of the processings which are executed by the high priority wait state release mechanism.

When the processings for the I/O request to a certain storage unit 150 has been completed, the associated transfer control processor 130 activates, in order to process another I/O request which has been in the wait state until that time, the high priority wait state release mechanism to release the wait state of the I/O request which has been in the wait state.

After activated, the high priority wait state release mechanism first refers to the wait state request table 602 to search all the I/O wait information 1100 which is registrated in the row corresponding to the storage unit 150 in which the I/O request has been completed, and then recognizes all the I/O requests which have been in the wait state to the storage unit 150 of interest (Step 1200). Next, the delay time table 141 is referred to read out the data transfer path delay time corresponding to all the data transfer paths, which are permitted to be used, with respect to the I/O requests which have been recognized in Step 1200 (Step 1210). Then, with respect to all the data transfer paths which are permitted to be used so as to process the I/O requests, a minimum value or a mean value of the data transfer delay time is calculated every I/O request to obtain the base delay time for the I/O requests (Step 1220). With respect to the base delay time in this case as well, in the same manner as in the processings executed by the reconnection starting time adjusting mechanism, whether the minimum value or the mean value of the data transfer path delay time thus read out is employed depends on the system request. For example, in the case where the response time of the data transfer path having the most rapid response is regarded as important, the minimum value is employed as the base delay time of the I/O requests. On the other hand, in the case where the response value of the average data transfer path is regarded as important, the mean value is employed. In this connection, in accordance with the system request, one of the minimum value and the mean value may be employed, or both the minimum value and the mean value may be employed with those values mixed.

Subsequently, in Step 1220, the base delay time which has been obtained every I/O request is employed to sort the I/O requests in the order of decreasing the base delay time (Step 1230). Then, in accordance with the sorting result, in the order of decreasing the base delay time in the I/O requests, the fact that the processings for the I/O request become able to be executed is posted to the host processor 120 which had issued that I/O request through the data transfer path which is permitted to be used (Step 1240). At this time, the transfer control processor 130 performs the notification to the host processor 120 after an interval of time equal to the difference in the base delay time between the present I/O request and the prior I/O request. In such a way, by providing the time interval for the notification to the host processors 120 corresponding to the I/O requests, the time when receiving the reexecution requests of the I/O requests returned from the host processors 120 can be made substantially the same.

In such a way, after posting the release of the wait state of the I/O requests to the host processors 120, the controller 110 receives the reexecution requests of the I/O requests to execute the processings therefor. Those processings are not different from those of the prior art in particular, and therefore, the description thereof is omitted here for the sake of simplicity.

In the first embodiment as described above, the sector, at which the set sector interrupt is to be generated as the opportunity for starting the reconnection, which is executed along with the positioning processing of the head and the like, is determined by taking the delay time in the data transfer paths between the controller and the host processors. Therefore, even in the system in which the lengths of the data transfer paths which are utilized for the processings are greatly different from one another depending on the transmission paths, and thus the time required for the reconnection to be executed is largely varied, it is possible to determine the timing suitable for the start of the reconnection in accordance with the lengths of the data transfer paths utilized. In addition, since the release of the wait state for a plurality of I/O requests which are in the wait state is controlled by taking the lengths of the data transfer paths between the host processors and the controller into consideration, it is possible to perform uniformly the service for a plurality of host processors to which the data transfer paths different in length from one another are connected.

Figure 10:
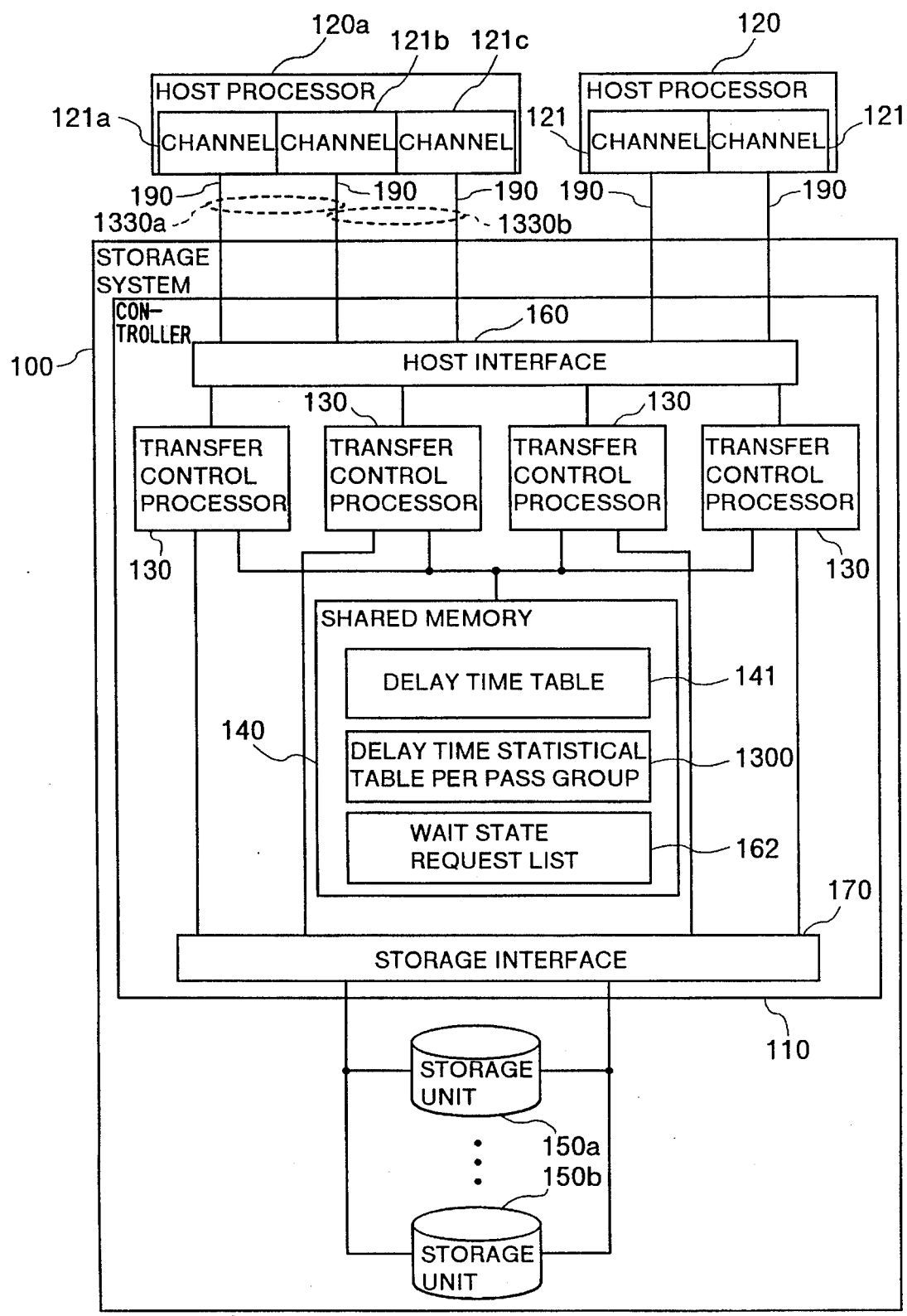
FIG. 10 is a block diagram showing a configuration of a computer system according to a second embodiment of the present invention.

FIG. 10 is a block diagram showing a schematic configuration of a second embodiment of the computer system to which the present invention is applied. The computer system in the present embodiment has also basically the same configuration as that of the computer system which has been described in the first embodiment of the present invention.

In the first embodiment, the control is performed in such a way that while performing the control by the delay time adaptive control facility, from the host processors 120 which had issued the I/O requests in the processing, all the associated data transfer paths were recognized, and with respect to all the corresponding data transfer paths, the data transfer path delay time was read out. However, there is a very severe limit in a time aspect to the processings executed by the transfer control processors 130. Therefore, in the method as described in the first embodiment, the processing overhead comes expensive. Then, in the present embodiment, there is shown a control method in which such overhead is effectively reduced. A point of difference of the present embodiment from the first embodiment is that the shared memory 140 includes a delay time statistical table per pass group 1300. Incidentally, in the present embodiment as well, a way of thinking with respect to the data transfer path corresponds to that in the first embodiment. However, in the present embodiment, a way of thinking with respect to a pass group is newly introduced into the data transfer paths. In FIG. 10, for the purpose of giving the description based on a way of thinking about the pass group, one of the host processors in FIG. 1 (a host processor 120a) has three channels (121a, 121b and 121c) and is connected to the controller 110 through the three cables. However, the host processor 120a and the three channels 121a, 121b and 121c are not basically different from the host processor 120 and the channels 121, which were described in the first embodiment, respectively. In addition, in the present embodiment as well, each transfer control processor 130 includes, as the characteristic facilities, both the delay time measuring facility and the delay time adaptive control facility. But, since a way of thinking about the pass group is introduced into the data transfer paths, the processings which are realized by those facilities are, as will be described later, slightly different from those in the first embodiment.

First, prior to the concrete description of the present embodiment, the description will hereinbelow be given with respect to a way of thinking about the pass group.

As described in the first embodiment as well, in the case where the host processor executes the data transfer processing between that host processor and the associated storage unit or units, all the cables which are distributed between that host processor and the controller are not always permitted to be used for the data transfer processing. In the present specification, in the case where the data transfer processing is performed between a certain host processor and a certain storage unit, a set of cables which are permitted to be used in order to execute the data transfer processing between that host processor and that storage unit is called "the pass group". Therefore, the pass group is defined by the number of combination of the host processors and the storage units. For example, in FIG. 10, it is assumed that the host processor 120a includes the three channels 121a, 121b and 121c, but only the channels 121a and 121b can be used when accessing to a storage unit 150a, and only the channels 121b and 121c can be used when accessing to a storage unit 150a. In such a case, a pass group consisting of the two cables 190 which are connected to the channels 121a and 121b, respectively and are surrounded by a broken line 1330a is a pass group which is used when the host processor 120a accesses to the storage unit 150a. Likewise, a pass group consisting of the two cables 190 which are connected to the channels 121b and 121c, respectively and are surrounded by a broken line 1330b is a pass group which is used when the host processor 120a accesses to the storage unit 150b.

In the present embodiment, if the data transfer path in which the data transfer delay time is measured is determined, the cable 190 to which that data transfer path corresponds is uniquely determined. In addition, as described above, the correspondence between the cables 190 and the pass groups is definitely determined. Therefore, the correspondence relationship between the data transfer paths and the pass groups, i.e., to which pass group a certain data transfer path belongs can be uniquely determined.

FIG. 11 shows a structure of a delay time statistical table per pass group 1300. The rows 1400 of the delay time statistical table per pass group 1300 correspond to the pass groups, respectively. The statistical information of the data transfer path delay time (the pass group delay time statistical information) which is measured with respect to the data transfer paths included in a certain pass group is stored in the corresponding row. In the present embodiment, as for the pass group delay time statistical information, the information such as a maximum value (a column 1410), a minimum value (a column 1420) and a mean value (a column 1430) of the data transfer path delay time in the pass group is prepared. The statistical processing for obtaining the pass group delay time statistical information is executed as a part of the processings in the delay time measuring facility.

Figure 12:
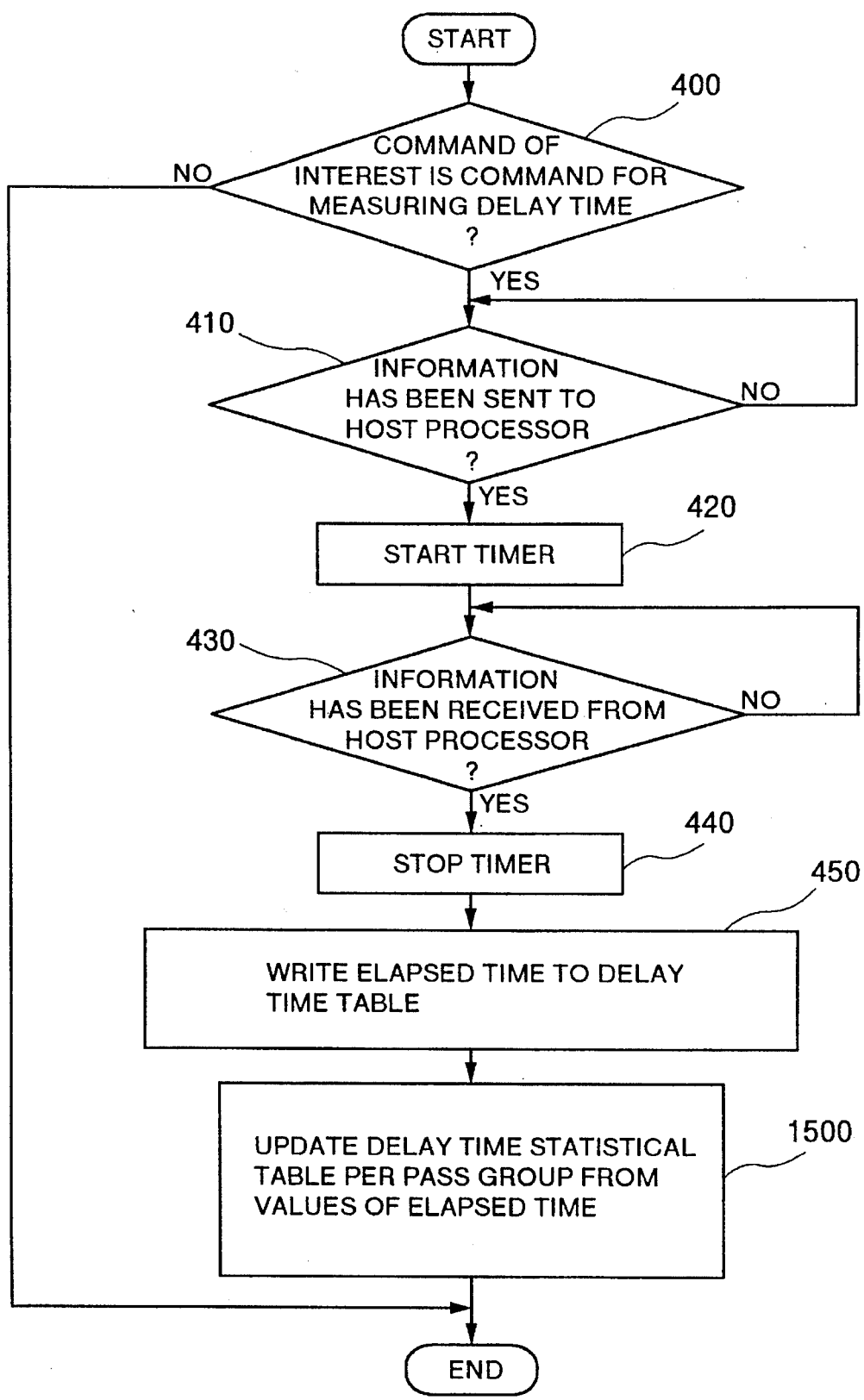
FIG. 12 is a flow chart showing a flow of the processings which are executed by the delay time measuring facility.

FIG. 12 is a flow chart showing a flow of the processings which are executed by the delay time measuring facility in the present embodiment. The delay time measuring facility of the present embodiment is different from the delay time measuring facility of the first embodiment in that in order to update the contents of the above-mentioned delay time statistical table per pass group 1300, the statistical processing of the data transfer path delay time is contained every pass group. In FIG. 12, in Steps from 400 to 450, the same processings as those executed by the delay time measuring facility in the first embodiment, which were described with reference to FIG. 5, are executed. Therefore, to the processings up to Step 450, the description of the first embodiment which was performed with reference to FIG. 5 is diverted, and thus the description thereof is omitted here for the sake of simplicity.

In the present embodiment, after obtaining the data transfer path delay time with respect to the data transfer paths in Step 450, the measured delay time of the data transfer paths 200 is subjected to the statistical processing in Step 1500. More specifically, the delay time table 141 is referred to read out the data transfer path delay time, which was written in Step 450, every pass group, from the entries corresponding to the data transfer paths belonging to the pass group. Then, the maximum value, the minimum value, the mean value and the like of the data transfer path delay time which was measured with respect to the data transfer paths in the pass group are calculated. The maximum value, the minimum value and the mean value thus obtained are respectively stored in the columns 1410, 1420 and 1430 of the row 1400, of the delay time statistical table per pass group 1300, to which the pass group corresponds, thereby updating the contents of the delay time statistical table per pass group 1300.

Next, the description will hereinbelow be given with respect to the delay time adaptive control facility in the present embodiment. The delay time adaptive control facility of the present embodiment has also, in the same manner as in the first embodiment, both the reconnection starting time adjusting mechanism and the high priority wait state release mechanism, and determines the control for processing the I/O requests in accordance with the data transfer path delay time. However, the present embodiment is different from the first embodiment in that in determining the control for the processings of the I/O requests, instead of the delay time table 141, the delay time statistical table per pass group 1300 is utilized.

Figure 13:
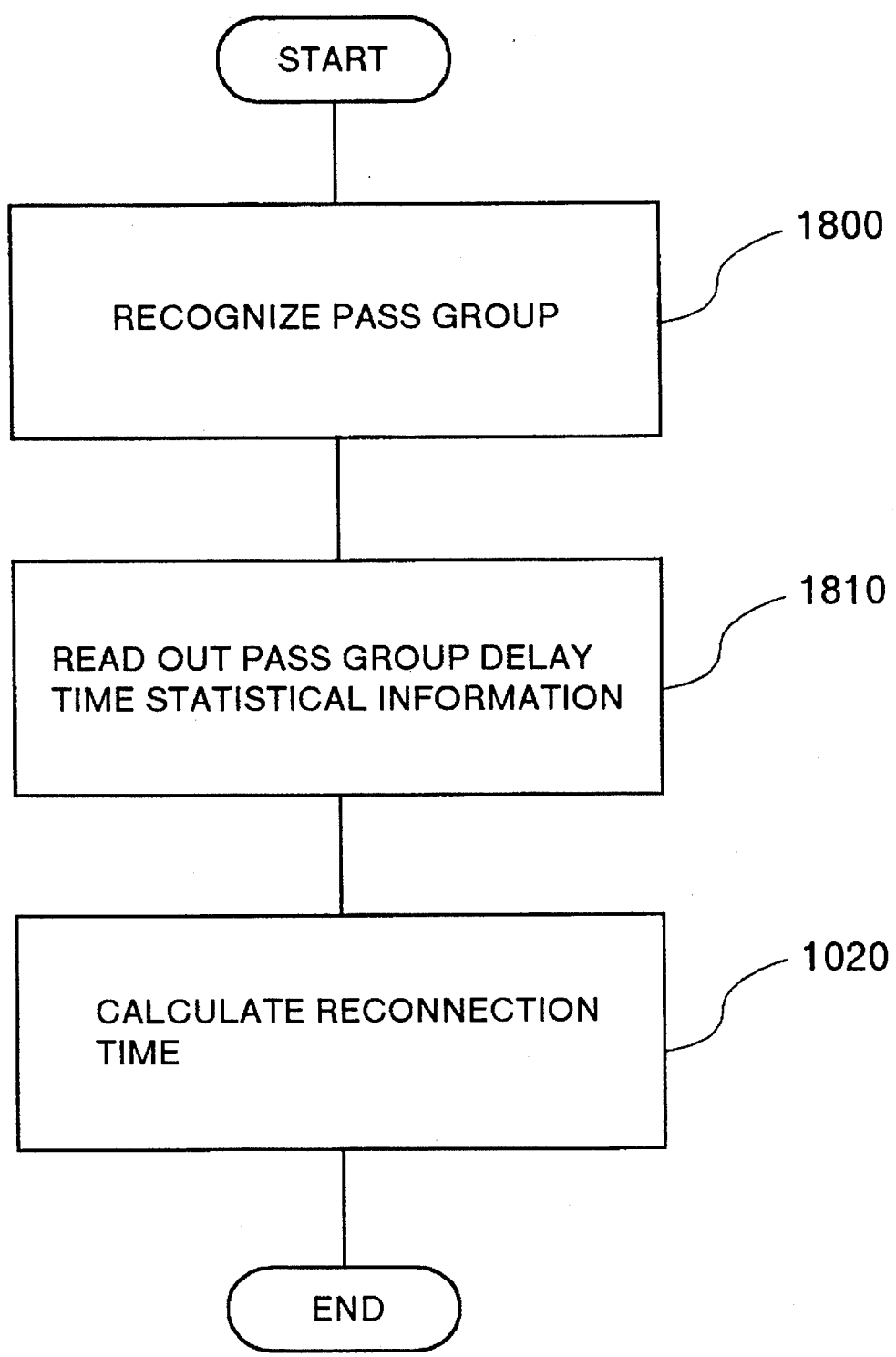
FIG. 13 is a flow chart showing a flow of the processings which are executed by the reconnection starting time adjusting mechanism.

FIG. 13 is a flow chart showing the processings which are executed by the reconnection starting time adjusting mechanism in the present embodiment. In the present embodiment as well, the reconnection starting time adjusting mechanism is activated when the transfer control processor 130 has received the I/O request issued from the host processor 120. After activated, the reconnection starting time adjusting mechanism first recognizes the pass group, which is permitted to be used in order for the host processor 120 to access to the storage unit 150, on the basis of the combination of the storage unit 150 which is to be accessed on the basis of the received I/O request and the host processor 120 which had issued the I/O request (Step 1800). Then, the delay time statistical table per pass group 1300 is referred to read out, as the pass group delay time statistical information, one of the maximum value in the column 1410 and the mean value in the column 1430 from the row 1400 corresponding to the pass group which was recognized in Step 1800 (Step 1810). In this case, as for the value read out, either the maximum value or the mean value may be read out. With respect to the selection of the maximum value or the mean value, the more suitable one may be selected in accordance with the system request. Next, with the pass group delay time statistical information, which was read out in Step 1810, as the base delay time, in the same manner as in Step 1020 of FIG. 8 in the first embodiment, in accordance with Expression (1), the sector number of the sector at which the set sector interrupt is, as the opportunity of the reconnection, to be generated by the storage unit 150 is calculated, thereby completing the processings executed by the reconnection starting time adjusting mechanism (Step 1820). Thereafter, the transfer control processor 130 issues the positioning request to the storage unit 150 using the sector number which was calculated by the reconnection starting time adjusting mechanism.

Figure 14:
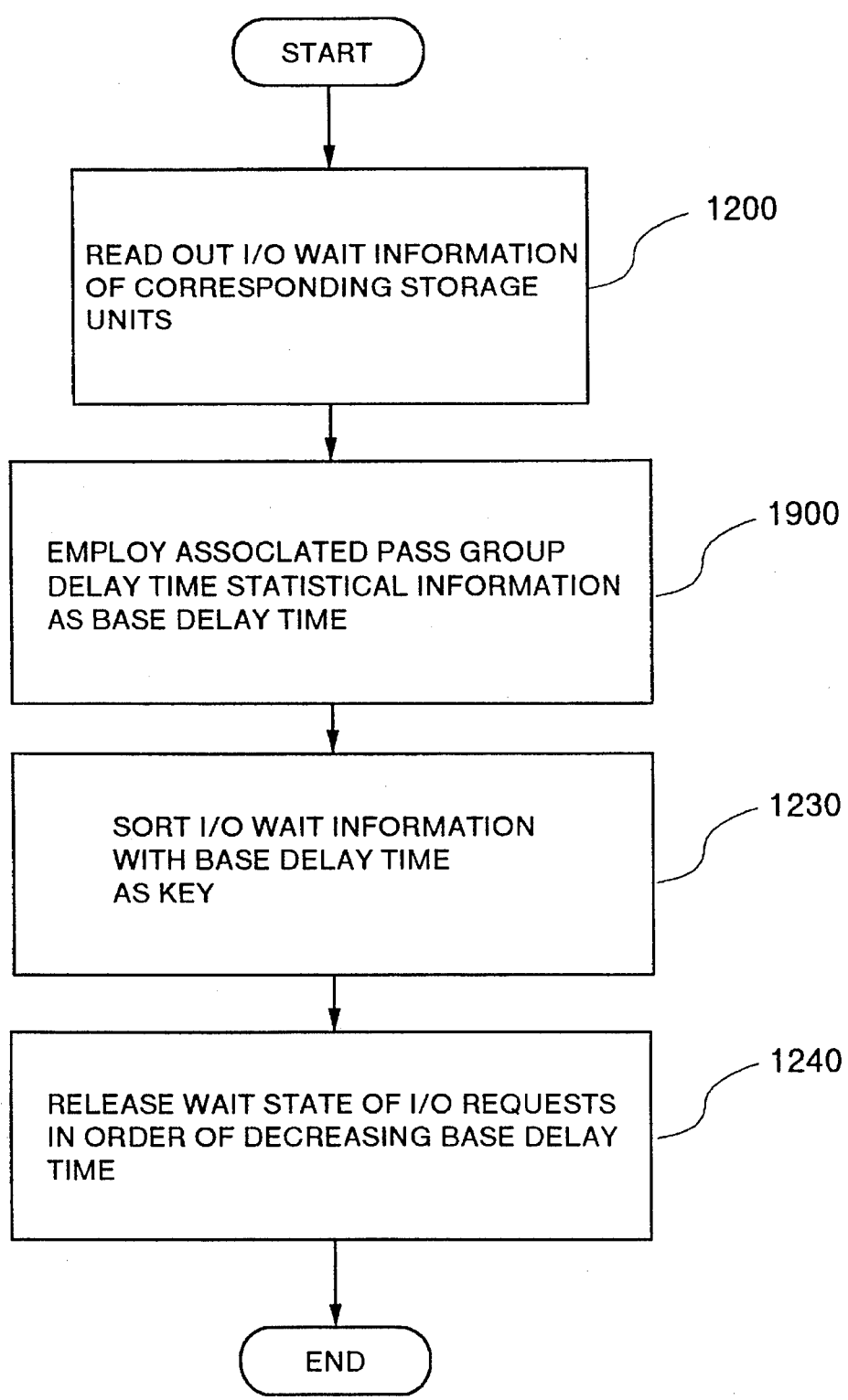
FIG. 14 is a flow chart showing a flow of the processings which are executed by the high priority wait state release mechanism.

FIG. 14 shows a flow chart of the processings which are executed by the high priority wait state release mechanism in the present embodiment. In FIG. 14, in Steps designated by the same reference numerals as those in FIG. 9, the same processings as those in the first embodiment which were described with reference to FIG. 9 are executed.

The high priority wait state release mechanism of the present embodiment is also, in the same manner as in the first embodiment, activated when the processings for the I/O request by which the data is read/written from/to a certain storage unit 150 have been completed. Then, in Step 1200, the I/O wait information is recognized which is in the wait state in order to read/write the data from/to the storage unit. Next, on the basis of the combination of the storage units 150 which become objects of the access with respect to all the I/O requests recognized in Step 1200, and the host processors which had issued those I/O requests, the pass group is recognized which is permitted to be used in order for the host processors 120 to access to the associated storage units 150. Then, one of the minimum value in the column 1420 and the mean value in the column 1430 are read out, as the pass group delay time statistical information, from the row 1400 of the delay time statistical table per pass group 1300 corresponding to the pass group, which was recognized, every I/O request (Step 1900). In this case, as for the value to be read out, either the minimum value or the mean value may be available. Thus, the selection thereof depends on the system request. Thereafter, with the pass group delay time statistical information read out in Step 1900 as the base delay time, the I/O wait information which was read out in Step 1200 is sorted (Step 1230). Then, in accordance with the sorting result, the release of the wait state is posted to the host processors 120 which had issued the respective I/O requests (Step 240).

According to the second embodiment as described above, the timing of start of the reconnection in processing the I/O requests issued from the host processors, or the base delay time which is used to control the release of the wait state of the I/O requests, which are in the wait state, is changed on the basis of the statistical information of the data transfer path delay time, which is previously obtained, every group Of the data transfer paths which are permitted to be used in order for the host processors to access to the associated storage units. Therefore, as compared with the first embodiment in which the base delay time is calculated in processing the I/O requests, the processing overhead in processing the I/O requests can be reduced, and also the I/O processings can be executed more efficiently.

Figure 15:
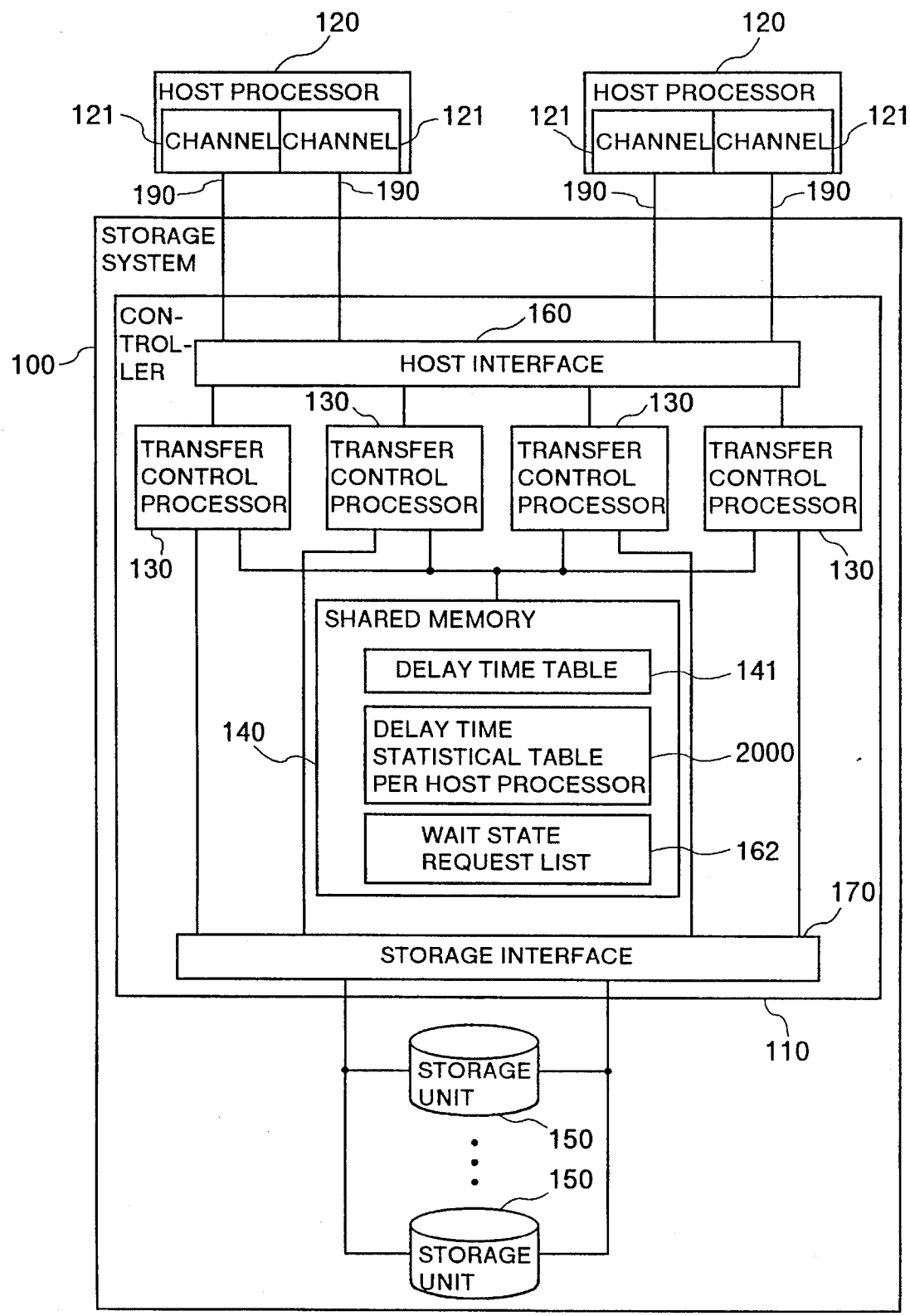
FIG. 15 is a block diagram showing a configuration of a computer system according to a third embodiment of the present invention.

FIG. 15 is a block diagram showing a schematic configuration of a third embodiment of the computer system to which the present invention is applied. The computer system in the present embodiment has also basically the same configuration as that of the computer system which was described in the first embodiment. The present embodiment is different from the first embodiment in that the shared memory 140 has newly a delay time statistical table per host processor 2000. In addition, as a result, the processings executed by the delay time measuring facility and the delay time adaptive control facility which are realized by each transfer control processor 130 are slightly different from those in the first embodiment. The configuration of other elements is the same as that of the first embodiment, and therefore, the description thereof is not given here in particular.

In the second embodiment as has already been described, in order to reduce the overhead of the processings which are realized by the delay time adaptive control facility, the processings are executed by utilizing the statistical information of the data transfer path delay time which is previously obtained every pass group. However, the number of pass groups is equal to the number of combination of the host processors 120 and the storage units 150. Therefore, if the number of combination of the host processors 120 and the storage units 150 increases, the capacity of the delay time statistical table per pass group 1300 shown in FIG. 10 is necessarily increased that much more remarkable. As a result, there arises the problem that the capacity of the shared memory 140 needs to be increased. Then, in the present embodiment, the data transfer path delay time which is measured every data transfer path 200 is converted into the statistical information in correspondence to the host processors 120 connected to the storage system 100, and thus, the necessary amount of information is reduced.

FIG. 16 shows a structure of the delay time statistical table per host processor 2000 provided in the shared memory 140. The rows 2100 of the delay time statistical table per host processor 2000 correspond to the host processors 120 connected to the controller 110. The statistical information (the host processor delay time statistical information) of the data transfer path delay time which is measured with respect to all the data transfer paths for transmitting the data to/from the host processors 120 is stored in the rows 2100. In the present embodiment, as for the host processor delay time statistical information, concretely, the information such as a maximum value (in a column 2110), a minimum value (in a column 2120) and a mean value (in a column 2130) of the data transfer path delay time which is obtained with respect to each data transfer path between each host processor and the controller 110 is prepared. This statistical processing is executed as a part of the processings executed by the delay time measuring facility.

Figure 17:
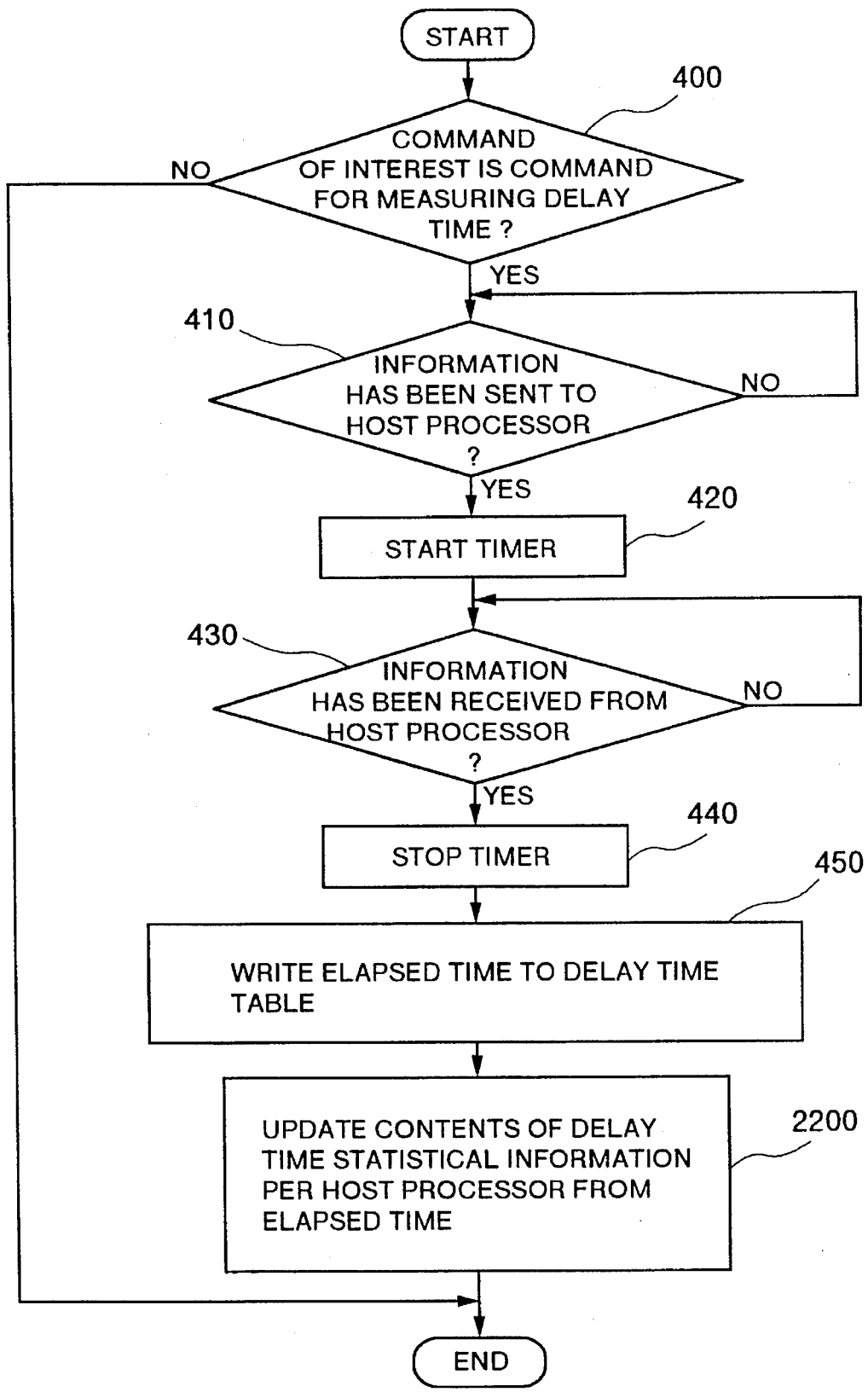
FIG. 17 is a flow chart showing a flow of the processings which are executed by the delay time measuring facility.

FIG. 17 is a flow chart showing a flow of the processings which are executed by the delay time measuring facility in the present embodiment. In the delay time measuring facility of the present embodiment as well, almost all the processings are, in the same manner as in the second embodiment, common to those executed by the delay time measuring facility in the first embodiment. In FIG. 17, in Steps from 400 to 450, the same processings as those, which are executed by the delay time measuring facility in the first embodiment which were described with reference to FIG. 5, are executed. Therefore, to the processings up to Step 450, the description of the first embodiment which was performed with reference to FIG. 5 is diverted, and thus, the description thereof is omitted here for the sake of simplicity.

In the present embodiment, after in Step 450, the data transfer delay time of the data transfer paths is written to the delay time table 141, in Step 2200, in correspondence to the host processors, the statistical processing is executed with respect to the data transfer paths connected thereto and then the contents of the delay time statistical table per host processor 2000 are updated. More specifically, the data delay time of the data transfer path is obtained every host processor connected by referring to the delay time table 141. Then, with respect to the measured information thus obtained, the statistical information such as the maximum value, the minimum value and the mean value of the data transfer delay time is calculated, and the resultant statistical information is written to the respective columns of the delay time statistical table per host processor 2000. Then, as the result of the statistical processing, the contents of the host processor delay time statistical information 2100 in the delay time statistical table per host processor 2000 corresponding to the host processors are updated.

Next, the description will hereinbelow be given with respect to the delay time adaptive control facility in the present embodiment. The delay time adaptive control facility of the present embodiment has also, in the same manner as in the first and second embodiments, both the reconnection starting time adjusting mechanism and the high priority wait state release facility, and determines the control for the processings of the I/O requests in accordance with the data transfer path delay time. But, the present embodiment is different from the first and second embodiments in that in determining the control for the processings of the I/O requests, the delay time statistical table per host processor 2000 is utilized.

Figure 18:
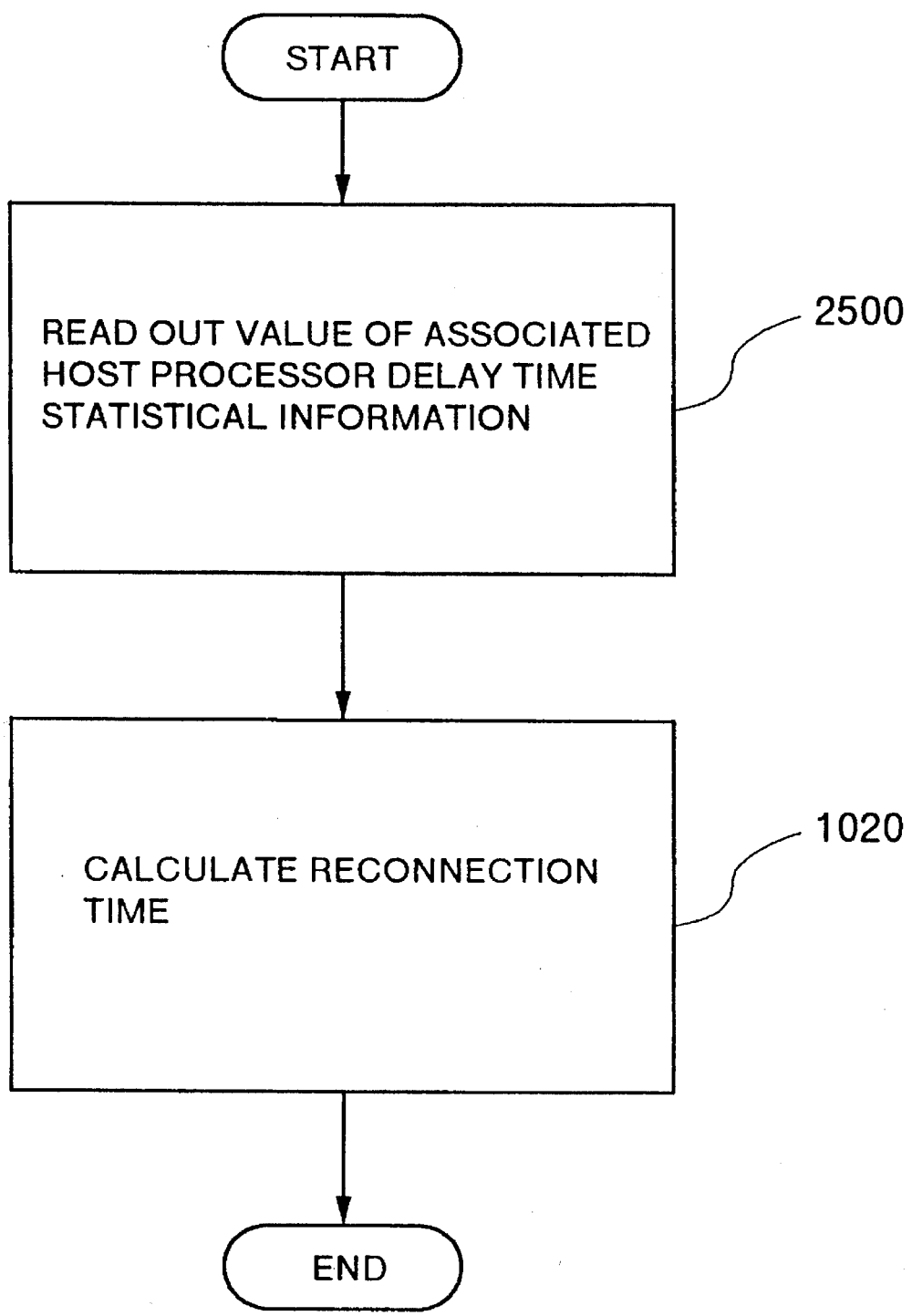
FIG. 18 is a flow chart showing a flow of the processings which are executed by the reconnection starting time adjusting mechanism.

FIG. 18 is a flow chart of the processings which are executed by the reconnection starting time adjusting mechanism in the present embodiment.

The transfer control processor 130 activates, when receiving the I/O request issued from the associated host processor 120, the reconnection starting time adjusting mechanism. In the processings executed by the reconnection starting time adjusting mechanism, first, the delay time statistical table per host processor 2000 is referred to read out the maximum value or the mean value of the host processor delay time statistical information which are respectively stored in the column 2110 or 2130 of the row 2100 corresponding to the host processor 120 which had issued the I/O request received (Step 2500). With respect to the selection of the maximum value or the minimum value in the subsequent processings, the more suitable one may be selected in accordance with the system request. Then, with the host processor delay time statistical information thus read out as the base delay time, in the same manner as in Step 1020 of FIG. 8 in the first embodiment, in accordance with Expression (1), the sector number of the sector at which the set sector interrupt is to be generated as the opportunity of the reconnection by the storage unit 150 is calculated, thereby completing the processings by the reconnection starting time adjusting mechanism (Step 1820). Thereafter, the transfer control processor 130 issues the positioning request to the associated storage unit 150 using the sector number which has been calculated by the reconnection starting time adjusting mechanism.

Figure 19:
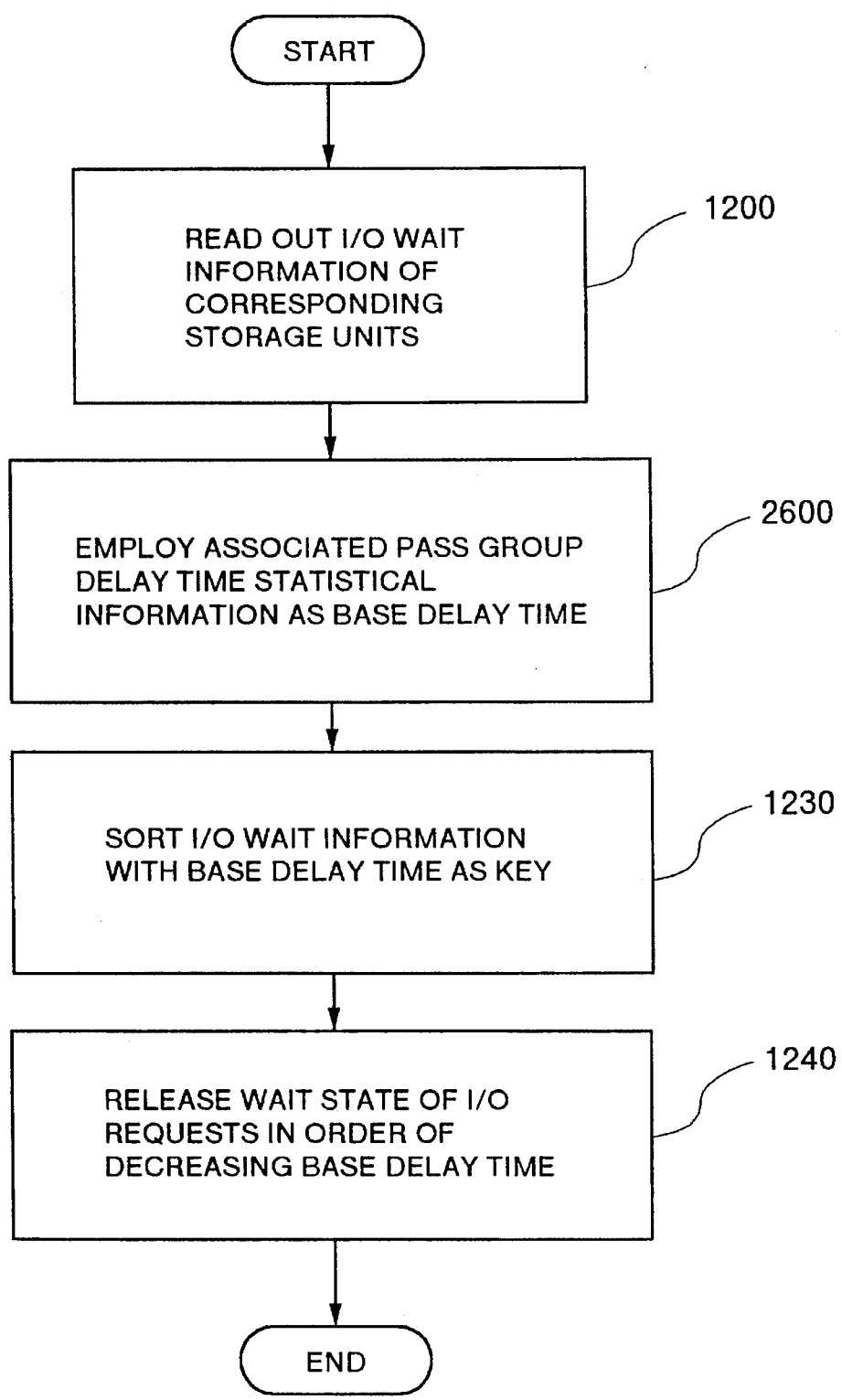
FIG. 19 is a flow chart showing a flow of the processings which are executed by the high priority wait state release mechanism.

FIG. 19 is a flow chart showing the processings which are executed by the high priority wait state release mechanism. In FIG. 19, in Steps designated by the same reference numerals as those in FIG. 9, the same processings as those in the first embodiment which were described with reference to FIG. 9 are executed.

The high priority wait state release mechanism of the present embodiment is also, in the same manner as in the first and second embodiments, activated when the processings for the I/O request by which the data is read/written from/to a certain storage unit 180 have been completed. Then, in Step 1200, the I/O wait information is recognized which is in the wait state in order to read/write the data from/to the storage unit. In the present embodiment, subsequently, the delay time statistical table per host processor 2000 is referred every I/O request read out in Step 1200 to read out the minimum value or the mean value of the host processor delay time statistical information from the column 2120 or 2130 of the row 2100 corresponding to the host processor 120 which had issued the I/O request. Whether the minimum value 2120 or the mean value 2130 is read out depends on the system request in the same manner as in the above-mentioned first and second embodiments. Thereafter, with the pass group delay time statistical information read out in Step 1900 as the base delay time, the I/O wait information which was read out in Step 1200 is sorted (Step 1230). Then, in accordance with the sorting result, the release of the wait state is posted to the host processors 120 which has issued the respective I/O requests (Step 1240).

According to the present embodiment, the data transfer delay time is subjected to the statistical processing in correspondence to the host processors connected to the storage system, and the resultant statistical information is utilized. Therefore, the amount of statistical information is not increased so much, and thus it is possible to prevent the capacity of the shared memory from being increased. In addition, in the same manner as in the second embodiment, as compared with the first embodiment in which the base delay time is calculated in processing the I/O requests, the processing overhead in processing the I/O requests can be reduced, and also the I/O processings can be executed efficiently.

As set forth hereinabove, according to the present invention, even in the case where the tolerance of the lengths of the data transfer paths through which the controller and the host processors are connected to one another is increased, and thus the delay time which occurs when the data is transmitted through the associated data transfer path or paths can not be disregarded for the control of the storage units, the processings corresponding to the delay time of the data transfer paths are executed. Therefore, the prevention of the useless occupation of the data transfer paths or the service balance between the I/O requests when releasing the wait state of the I/O requests can be realized.

We claim:

1. A storage system connected to at least one host processor through at least one data transfer path, comprising:

means for obtaining, every data transfer path, information relating to delay time, which occurs when transferring the data through the data transfer path of interest, to store the resultant information;

at least one storage unit for moving a head for reading/writing the data relatively to a storage medium to read/write the data from/to said storage medium;

means for determining, in order to perform the data transfer between the host processors which had issued I/O requests and the associated storage units which are to be accessed by the I/O requests on the basis of the information relating to the delay time stored in said storage means, the timing when starting reconnection for occupying one of said at least one data transfer path in accordance with the I/O requests issued from said host processors; and means for issuing a positioning request including information for indicating the timing determined by said determination means, for positioning the head near the position on the storage medium in which the data is stored which is to be accessed by the I/O request to the storage unit.

2. A storage system according to claim 1, wherein said at least one storage unit includes means for posting that the head is positioned in the vicinity of the position on the storage medium in which the data is stored which is to be accessed by the I/O request in accordance with the timing indicated by the electric positioning request.

3. A storage system according to claim 2, further comprising:

means for receiving the notification issued from the storage unit to execute the reconnection; and means for executing read/write of the data based on the I/O request by utilizing the data transfer path or paths secured by the reconnection.

4. A storage system according to claim 1, wherein said determination means determines the timing on the basis of the information showing the largest delay time among the information relating to the delay time which is stored in said storage means with respect to the data transfer paths which are permitted to be used between the host processors which had issued the I/O requests and the associated storage units which are to be accessed by the I/O requests.

5. A storage system according to claim 1, wherein said determination means obtains a mean value of the delay time from the information relating to the delay time which is stored in said storage means with respect to the data transfer paths which are permitted to be used between the host processors which had issued the I/O requests and the associated storage units which are to be accessed by the I/O requests to determine the timing on the basis of the resultant mean value.

6. A storage system according to claim 1, further comprising:

means for holding the information relating to the I/O requests which had issued from the host processors and are in a wait state in order to process other I/O requests;

means for selecting and extracting, in response to the completion of the processings of other I/O requests, the I/O requests by which the storage units which were accessed by other I/O requests are to be accessed out of the I/O requests in the wait state; and means for releasing the wait state of the I/O requests, which are extracted by said extraction means, on the basis of the information relating to the delay time with respect to the data transfer paths which are permitted to be used in order to process the I/O requests stored in said storage means, with respect to the I/O requests extracted by said extraction means.

7. A storage system according to claim 6, wherein said means for releasing the wait state obtains, every I/O request extracted by said extraction means, a mean value or a minimum value of the delay time with respect to the data transfer path or paths, which is/are permitted to be used in order to process the I/O request of interest as base delay time about the I/O request of interest, and posts the release of the wait state to the host processors which had issued the I/O requests in the wait state in the order of decreasing the base delay time.

8. A storage system according to claim 1, wherein said storage means measures the delay time with respect to said data transfer paths between said storage system and said host processors, calculates, every combination of said host processors and said storage units, statistical information of the delay time obtained by the measurement, with respect to a set of the data transfer paths which are permitted to be used in order to process the I/O request based on the combination of interest, and stores the statistical information.

9. A storage system according to claim 8, wherein said means for determining the timing recognizes a group of data transfer paths which are permitted to be used with respect to the combination of the host processors which had issued the I/O requests and the associated storage units which are to be accessed by the I/O requests, and determines the timing in accordance with the statistical information calculated with respect to the set of data transfer paths thus recognized.

10. A storage system according to claim 9, wherein the statistical information includes a maximum value or a mean value of the delay time which was measured by the measurement with respect to the data transfer paths included in the set of data transfer paths.

11. A storage system according to claim 6, wherein said storage means measures the delay time with respect to said data transfer paths between said storage system and said host processors, calculates, every combination of said host processors and said storage units, statistical information of the delay time obtained by the measurement, with respect to the set of the data transfer paths, which are permitted to be used in order to process the I/O request based on the combination of interest, and releases the wait state using the statistical information.

12. A storage system according to claim 11, wherein the statistical information includes a minimum value or a mean value of the delay time which is measured by the measurement with respect to the data transfer paths included in the set of data transfer paths.

13. A storage system according to claim 1, wherein said storage means measures the delay time with respect to said data transfer paths between said storage system and said host processors, calculates, every host processor, statistical information of the delay time which was obtained by the measurement with respect to the data transfer path or paths connected to the host processor of interest, and stores the statistical information thus calculated.

14. A storage system according to claim 13, wherein said means for determining the timing determines the timing in accordance with the statistical information which was calculated with respect to the data transfer paths connected to the host processors which had issued the I/O requests.

15. A storage system according to claim 14, wherein the statistical information includes a maximum value or a mean value of the delay time which was measured by the measurement with respect to the data transfer paths connected to the host processors.

16. A storage system according to claim 6, wherein said storage means measures the delay time with respect to said data transfer paths between said storage system and said host processors, calculates, every host processor, statistical information of the delay time which was obtained by the measurement with respect to the data transfer path or paths connected to the host processor of interest, and stores the statistical information thus calculated, and said means for releasing the wait state releases the wait state using the statistical information.

17. A storage system according to claim 16, wherein the statistical information includes a maximum value or a mean value of the delay time which was measured by the measurement with respect to the data transfer paths connected to the host processors.

18. A storage system connected to a plurality of host processors through at least one data transfer path, comprising:

means for obtaining, every data transfer path, information relating to delay time, which occurs when transferring the data through the data transfer path of interest, to store the resultant information;

at least one storage unit;

I/O processing means for accessing to the storage units in accordance with I/O requests issued from the host processors to control read/write of the data from/to the storage units;

means for holding information relating to the I/O requests which has been issued from the host processors and are in a wait state due to the processing of other I/O requests which are being executed by said I/O processing means;

means for selecting and extracting, in response to the completion of the processings of other I/O requests by said I/O processing means, the I/O requests by which the storage units which were accessed by other I/O requests are to be accessed among the I/O requests in a wait state; and means for releasing the wait state of the I/O requests, which were extracted by said extraction means on the basis of base delay time representing the delay time with respect to the data transfer paths which are permitted to be used in order to process the I/O requests, which are determined on the basis of the information relating to the delay time, of said data transfer paths, stored by said storage means, with respect to the I/O requests extracted by said extraction means.

19. A storage system according to claim 18, wherein said means for releasing the wait state posts the release of the wait state to the host processors which had issued the I/O requests in the wait state in the order of decreasing the base delay time.

20. A storage system according to claim 19, wherein said means for releasing the wait state calculates, with respect to the I/O requests extracted by said extraction means, the base delay time on the basis of the delay time of the data transfer paths which are permitted to be used in order to process the I/O requests.

21. A storage system according to claim 20, wherein said means for releasing the wait state calculates a minimum value or mean value of the delay time, as the base delay time, on the basis of the delay time which is stored with respect to the data transfer paths which are permitted to be used.

22. A storage system according to claim 19, wherein said storage means measures the delay time with respect to said data transfer paths between said storage system and said host processors, calculates, every combination of said host processors and said storage units, statistical information of the delay time obtained by the measurement, with respect to a set of the data transfer paths which are permitted to be used in order to process the I/O request based on the combination of interest, and stores the statistical information, and said means for releasing the wait state calculates the base delay time from the statistical information thus calculated.

23. A storage system according to claim 22, wherein the statistical information includes a minimum value or a mean value of the delay time which was measured by the measurement with respect to the data transfer paths included in the set of data transfer paths.

24. A storage system according to claim 19, wherein said storage means measures the delay time with respect to said data transfer paths between said storage system and said host processors, calculates, every host processor, statistical information of the delay time which was obtained by the measurement with respect to the data transfer path or paths connected to the host processor of interest, and stores the statistical information thus calculated, and said means for releasing the wait state obtains the base delay time from the statistical information.

25. A storage system according to claim 24, wherein the statistical information includes a minimum value or a mean value of the delay time which was measured with respect to said data transfer paths connected to said host processors.

26. A storage system connected to at least one host processor through at least one data transfer path, comprising:

means for obtaining, every data transfer path, information relating to delay time, which occurs when transferring the data through the data transfer path of interest, to store the resultant information;

at least one storage unit for moving a head for reading/writing the data relatively to a storage medium to read/write the data from/to said storage medium; and control means for determining, in accordance with I/O requests issued from the host processors, the control for the processings of the I/O requests on the basis of the information relating to the delay time stored in said storage means to execute the processings for the I/O requests in accordance with the determination.

27. A storage system according to claim 26, wherein said storage means includes:

means for measuring and storing, every data transfer path, the information relating to the delay time which occurs when transmitting the data through the data transfer path of interest; and means for producing and storing, every combination of said host processors and said storage units, statistical information from the information relating to the delay time, which were obtained by the measurement, with respect to a set of data transfer paths which are permitted to be used in processing the I/O request based on the combination of interest, and said control means performs the determination of the control on the basis of the statistical information thus stored.

28. A storage system according to claim 26, wherein said storage means includes:

means for measuring and storing, every data transfer path, the information relating to the delay time which occurs when transmitting the data through the data transfer path of interest; and means for calculating and storing, every host processor, statistical information from the information relating to the delay time which was obtained by the measurement with respect to the data transfer paths connected to the host processor of interest, and said control means includes means for changing, on the basis of the statistical information thus stored, the control for the I/O requests which had been issued from the host processors to the associated storage unit.

29. In a storage system connected to at least one host processor through at least one data transfer path and including at least one storage unit which is accessed by said at least one host processor and a controller for controlling the access to said at least one storage unit, a method of controlling said storage system executed by said controller, comprising the steps of:

measuring and storing, every data transfer path, information relating to delay time which occurs when transferring the data through the data transfer path of interest;

determining, in order to perform the data transfer between the host processors which had issued I/O requests and the associated storage units which are to be accessed by the I/O requests on the basis of the information relating to the delay time stored, the timing when starting reconnection for occupying one of said data transfer paths in accordance with the I/O requests issued from the host processors; and issuing a positioning request including information for indicating the determined timing, for positioning a head near the position on a storage medium in which the data is stored which is to be accessed by the I/O request to each of said storage units.

30. A control method according to claim 29, wherein said storing step comprises the steps of:

measuring and storing the information relating to the delay time every data transfer path; and referring to the information relating to the delay time thus stored and producing and storing, every combination of said host processors and said storage units, with respect to a set of data transfer paths which are permitted to be used in processing the I/O requests based on the combination of interest, statistical information from the information relating to the delay time;

and wherein said timing determining step is to determine the timing on the basis of the statistical information.

31. A control method according to claim 29, wherein said storing step comprises the steps of:

measuring and storing the information relating to the delay time every data transfer path; and referring to the information relating to the delay time thus stored and producing and storing, every host processor, statistical information of the information relating to the delay time with respect to the data transfer path or paths connected to the host processor of interest;

and wherein said timing determining step is to determine the timing on the basis of the statistical information.

32. In a storage system connected to at least one host processor through at least one data transfer path and including at least one storage unit which is accessed by said at least one host processor and a controller for controlling the access to said at least one storage unit, a method of controlling said storage system executed by said controller, comprising the steps of:

measuring and storing, every data transfer path, information relating to delay time which occurs when transferring the data through the data transfer path of interest;

holding information relating to I/O requests, in a wait state, waiting completion of the processings for other I/O requests out of the I/O requests issued from the host processors;

selecting, in accordance with the completion of the processings for other I/O requests, the I/O requests to the storage units accessed by other I/O requests from the I/O requests in the wait state;

obtaining, every selected I/O request in the state state, base delay time representing the delay time of the data transfer path used to process the I/O request of interest on the basis of the information relating to the delay time; and releasing the wait state of the I/O requests in the wait state in accordance with the base delay time.

33. A control method according to claim 32, wherein said releasing step comprises steps of:

sorting the information relating to the I/O requests selected in the order of decreasing the base delay time; and posting, in accordance with the sorting order, the release of the wait state to the host processors which had issued the I/O requests selected.

34. A control method according to claim 33, wherein said base delay time obtaining step comprises the steps of:

reading out, from the delay time of said data transfer paths, with respect to each selected I/O request, the delay time of the data transfer path or paths which is/are permitted to be used to process the selected I/O request of interest; and employing, with respect to each selected I/O request, a minimum value of the delay time read out as the base delay time.

35. A control method according to claim 33, wherein said storing step comprises the steps of:

measuring and storing the information relating to the delay time every data transfer path; and referring to the information relating to the delay time thus stored and producing and storing, every combination of said host processors and said storage units, with respect to a set of data transfer paths which are permitted to be used in processing the I/O requests based on the combination of interest, statistical information from the information relating to the delay time;

and wherein said base delay time obtaining step is to obtain the base delay time from the statistical information.

36. A control method according to claim 33, wherein said storing step comprises the steps of:

measuring and storing the information relating to the delay time every data transfer path; and referring to the information relating to the delay time thus stored and producing and storing, every host processor, statistical information of the information relating to the delay time with respect to the data transfer path or paths connected to the host processor of interest;

and wherein said base delay time obtaining step is to obtain the base delay time from the statistical information.

37. In a storage system connected to at least one host processor through at least one data transfer path and including at least one storage unit which is accessed by said at least one host processor and a controller for controlling the access to said at least one storage unit, a method of controlling said storage system executed by said controller, comprising the steps of:

measuring and storing, every data transfer path, information relating to delay time which occurs when transferring the data through the data transfer path of interest;

determining, in accordance with I/O requests issued from the host processors, the control for processing the I/O requests on the basis of the information relating to the delay time thus stored; and executing the processings for the I/O requests in accordance with the determination.

* * * * *